Jan. 7, 1930.  W. S. GUBELMANN  1,742,530
NONPRINT MECHANISM FOR CALCULATING AND LIKE MACHINES
Original Filed Jan. 10, 1900  7 Sheets-Sheet 1

William S. Gubelman
INVENTOR.

Jan. 7, 1930. W. S. GUBELMANN 1,742,530
NONPRINT MECHANISM FOR CALCULATING AND LIKE MACHINES
Original Filed Jan. 10, 1900   7 Sheets-Sheet 2
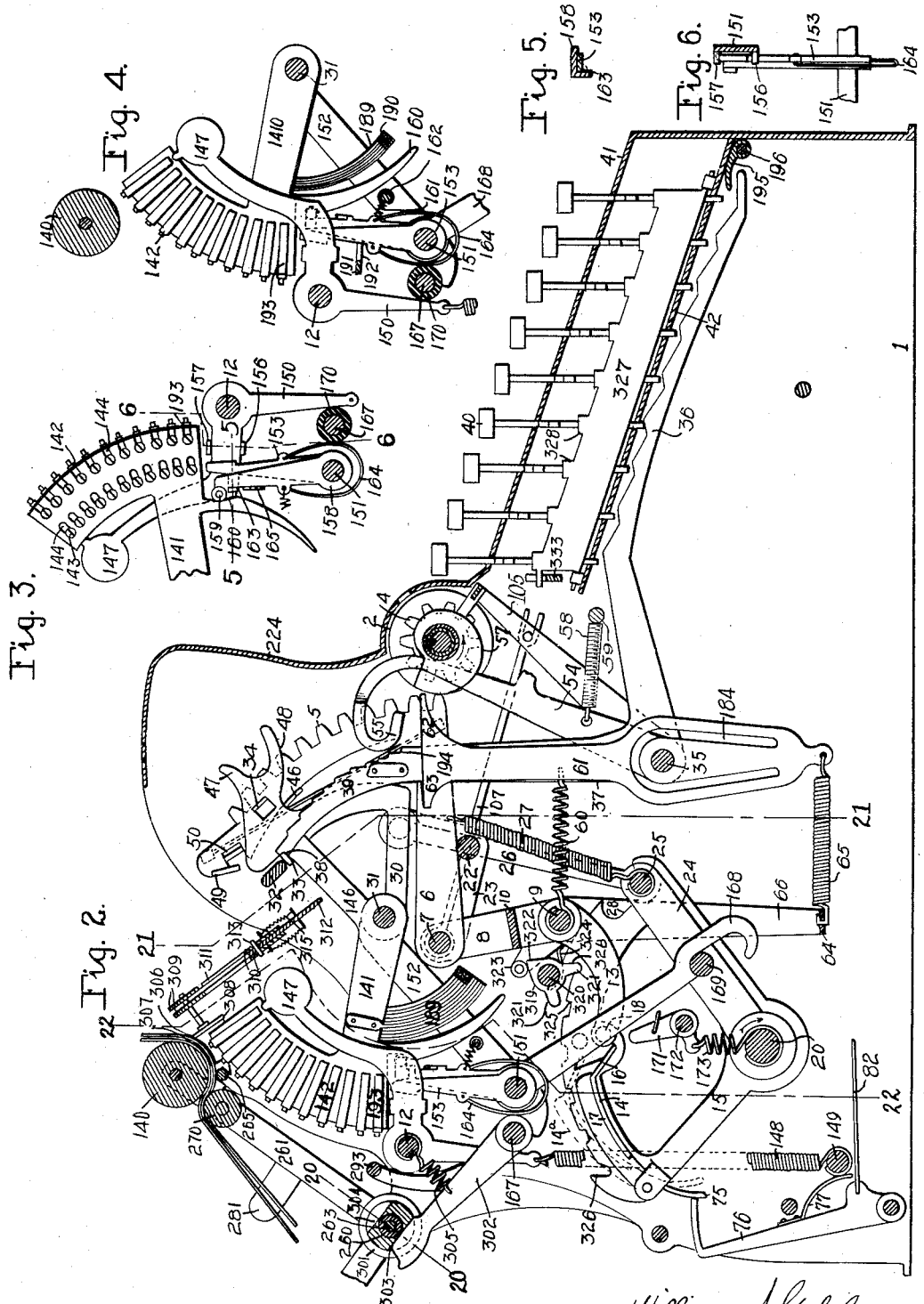

Jan. 7, 1930.  W. S. GUBELMANN  1,742,530
NONPRINT MECHANISM FOR CALCULATING AND LIKE MACHINES
Original Filed Jan. 10, 1900  7 Sheets-Sheet 3
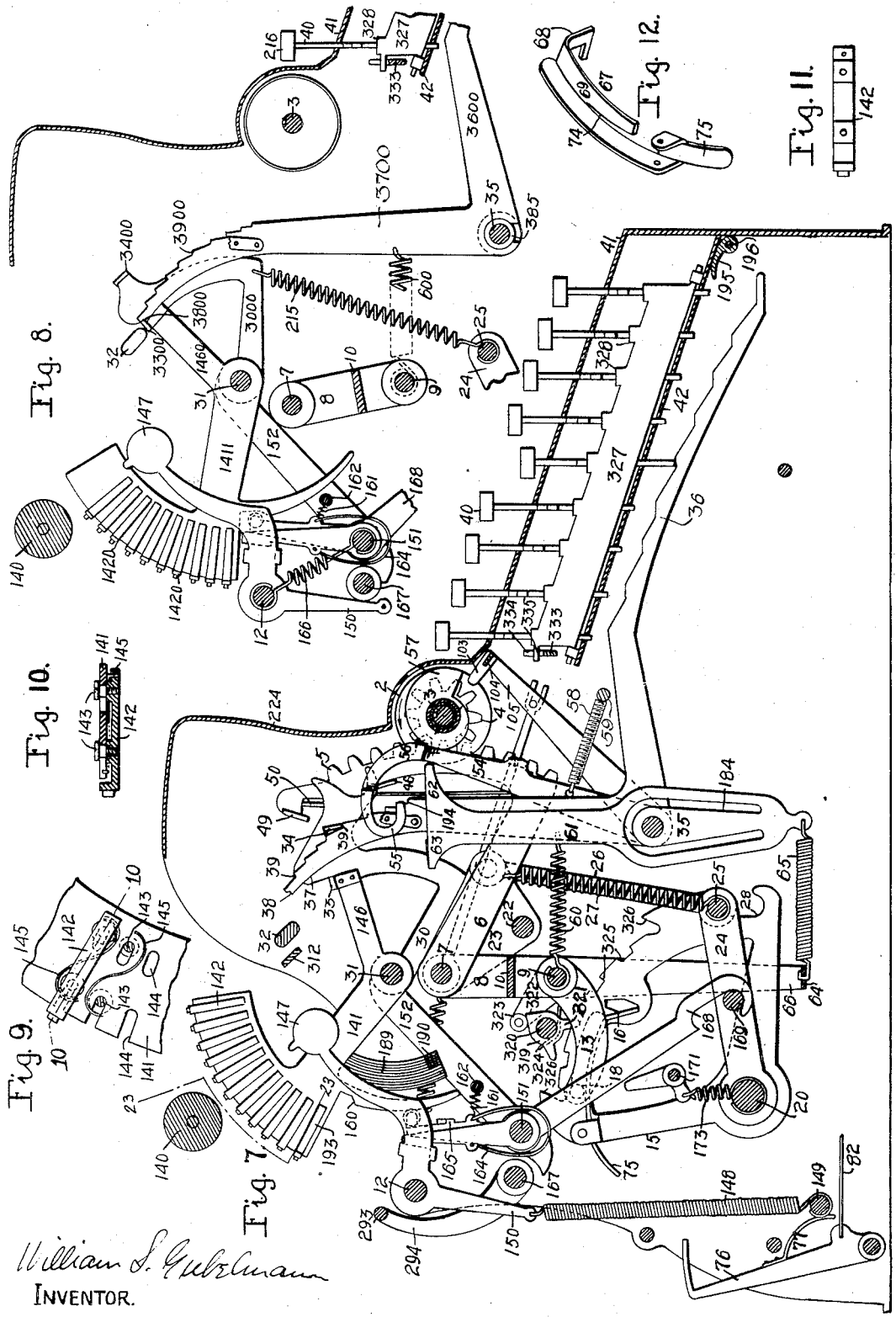
William S. Gubelmann
INVENTOR.

Jan. 7, 1930.  W. S. GUBELMANN  1,742,530
NONPRINT MECHANISM FOR CALCULATING AND LIKE MACHINES
Original Filed Jan. 10, 1900   7 Sheets-Sheet 4
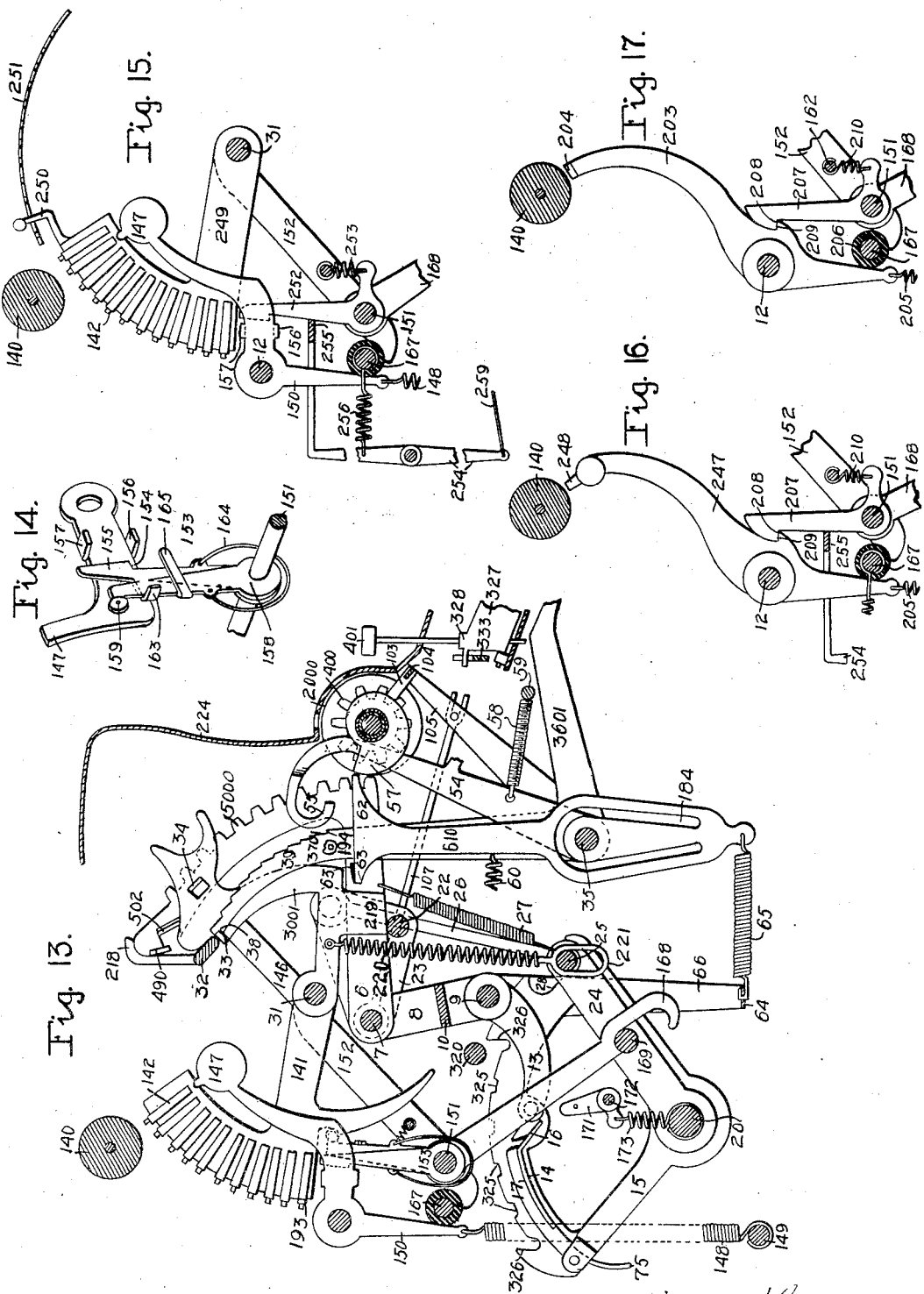
INVENTOR.

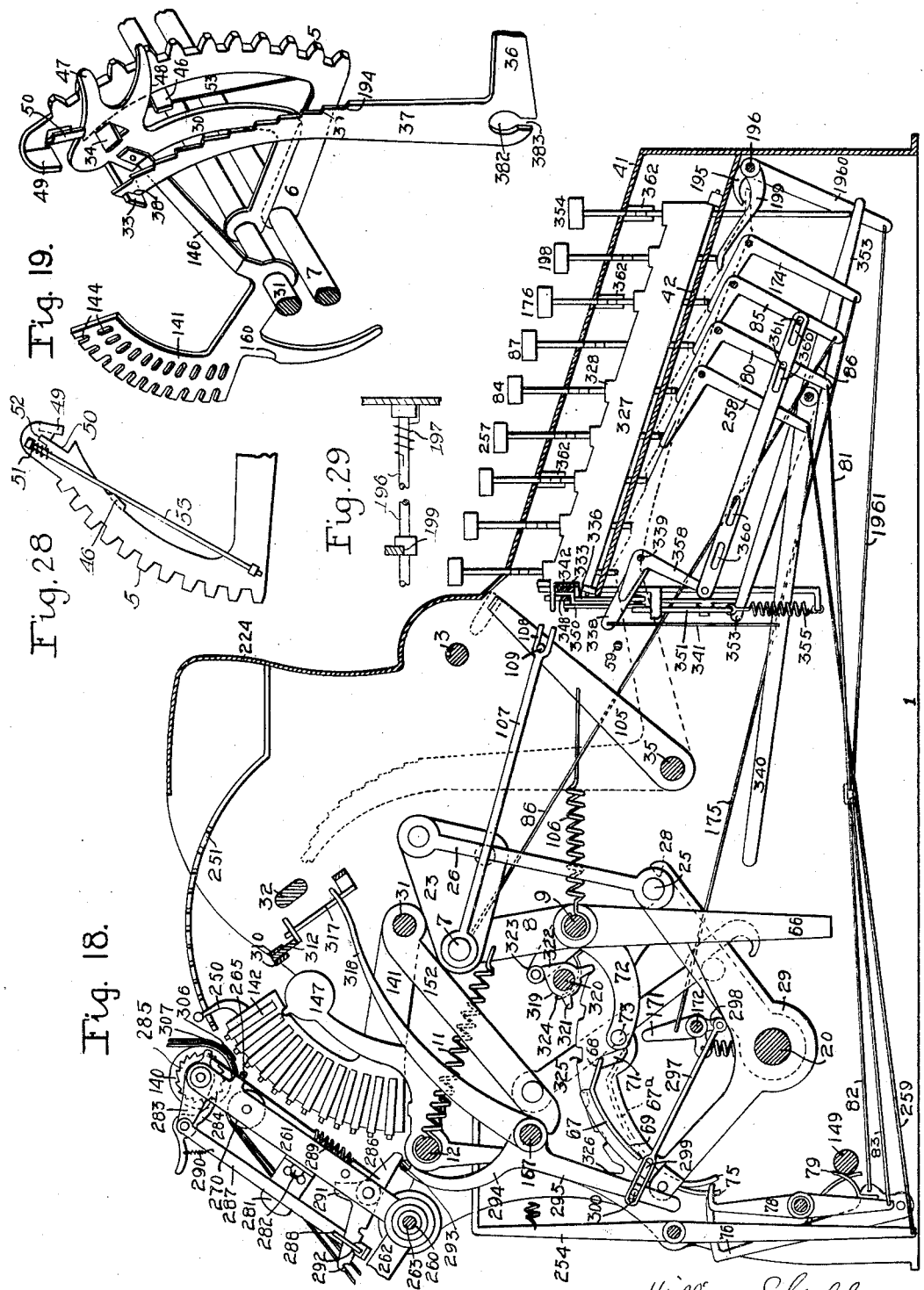

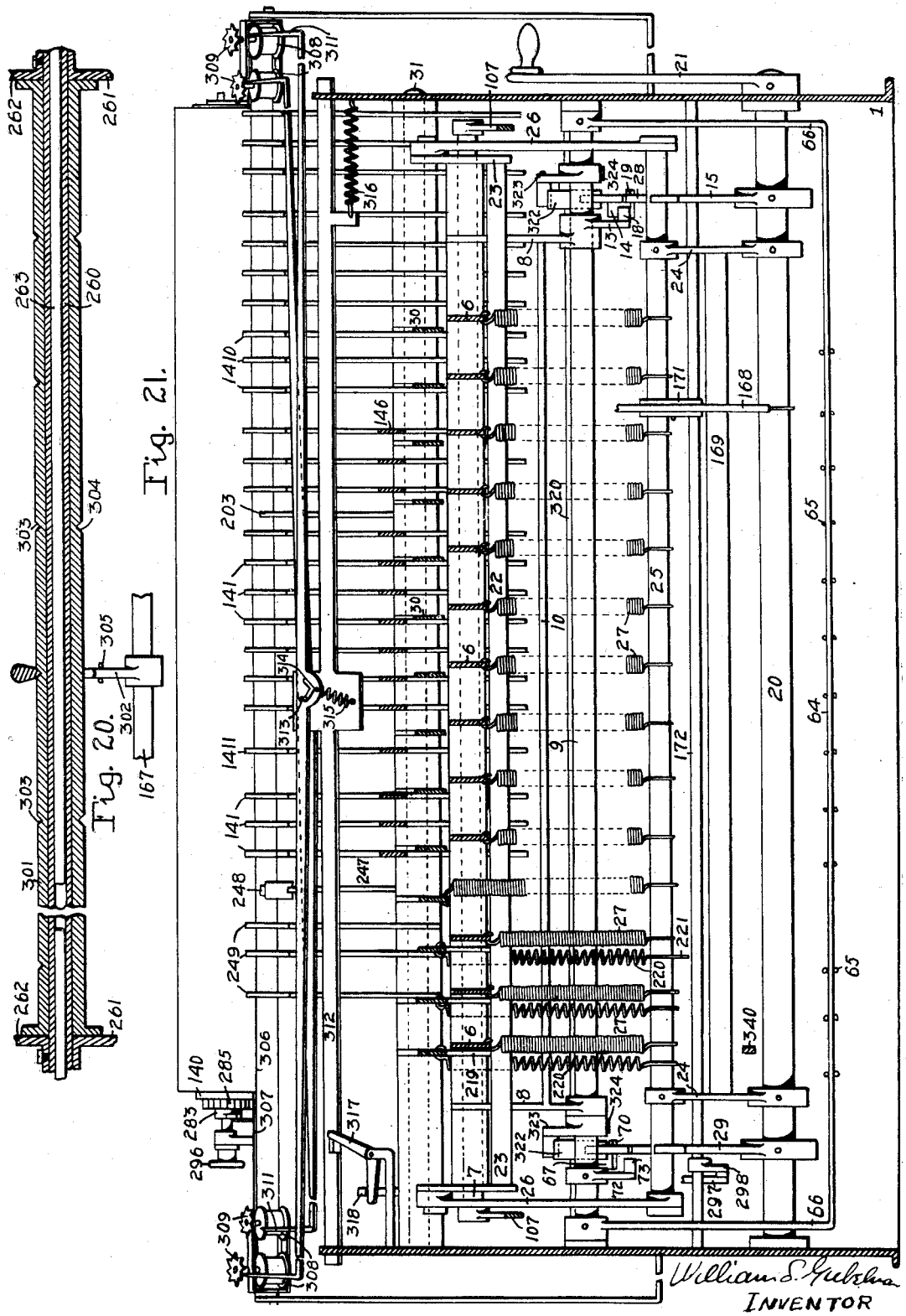

Jan. 7, 1930.   W. S. GUBELMANN   1,742,530
NONPRINT MECHANISM FOR CALCULATING AND LIKE MACHINES
Original Filed Jan. 10, 1900   7 Sheets-Sheet 7
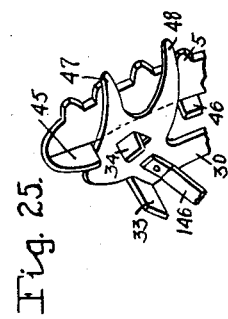
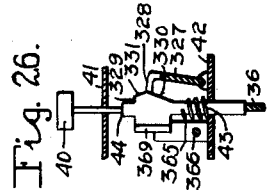
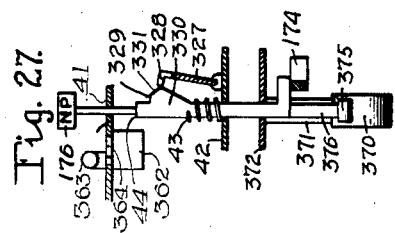
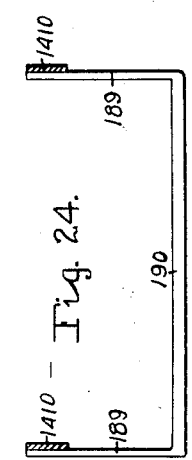
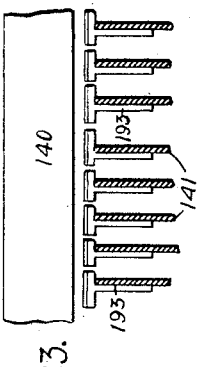
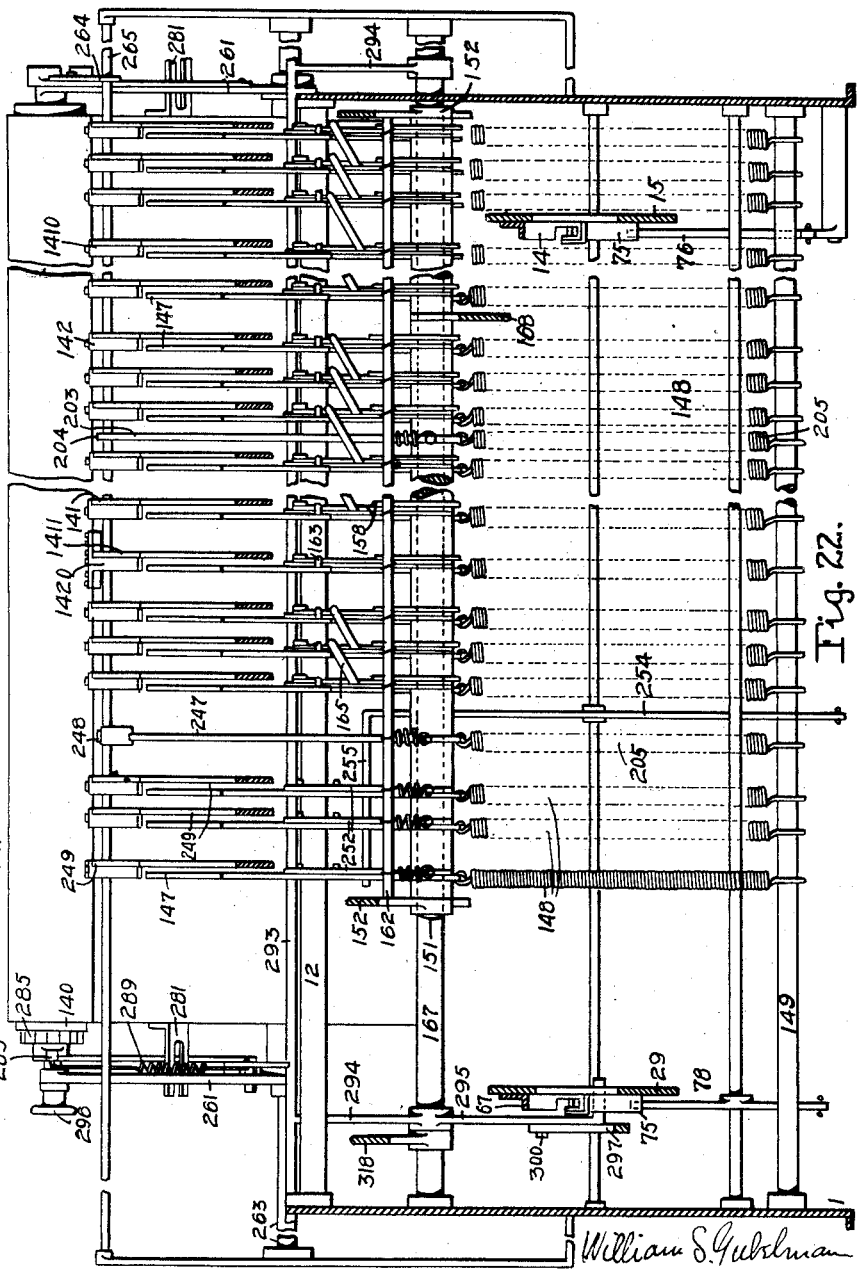
INVENTOR.

Patented Jan. 7, 1930

1,742,530

UNITED STATES PATENT OFFICE

WILLIAM S. GUBELMANN, OF BUFFALO, NEW YORK

NONPRINT MECHANISM FOR CALCULATING AND LIKE MACHINES

Original application filed January 10, 1900, Serial No. 1,004. Divided and this application filed July 22, 1918. Serial No. 246,158.

The present invention relates particularly to non-print mechanism for calculating and like machines, and is a division of my pending application Serial No. 1,004, filed Jan. 10, 1900, and eventuating in Patent No. 1,429,201, granted September 12, 1922.

One object of the invention is to provide mechanism whereby the printing mechanism of a set of accumulators may be rendered inoperative.

Another object is to provide mechanism whereby duplicate sets of types controlled from a common controlling mechanism to effect printing of items in duplicate, may be rendered inoperative.

Another object is to provide mechanism whereby the printing mechanisms of separate independent sets of accumulators may be rendered inoperative.

Another object is to provide means for rendering a word printing mechanism inoperative.

Another object is to provide means for rendering a vertical ruling mechanism inoperative.

Another object is to provide means for rendering a horizontal ruling mechanism inoperative.

Another object is to provide means for rendering a date printing mechanism inoperative.

Other objects will be pointed out in the following description and claims. The mechanism for accomplishing these objects is illustrated in the accompanying drawings consisting of seven sheets, in which:

Fig. 2 is a vertical longitudinal section of the same, taken substantially in line 2—2, Figure 1, and showing the adding and recording mechanism of one column or set of keys in the normal or inoperative position.

Fig. 3 is a fragmentary sectional elevation of the printing mechanism of one of the rows of keys viewed from the side opposite to that shown in Figure 2.

Fig. 4 is a fragmentary sectional elevation taken in line 4—4, Figure 1, and showing the devices whereby numbers are printed in duplicate.

Fig. 5 is a horizontal section in line 5—5, Figure 3.

Fig. 6 is a vertical section in line 6—6, Figure 3.

Fig. 7 is a view similar to Figure 2 showing the adding and recording mechanism in a shifted position.

Fig. 8 is a fragmentary longitudinal sectional elevation taken substantially in line 8—8, Figure 1, and showing the mechanism whereby words are printed.

Fig. 9 is a fragmentary sectional side elevation of one of the printing segments, showing the means for mounting the type movable thereon.

Fig. 10 is a cross section of the type segment taken in line 10—10, Figure 9.

Fig. 11 is a side view of one of the type carriers viewed from the side opposite to that shown in Figure 9.

Fig. 12 is a perspective view, showing one of a pair of substantially similar cams, one of which serves to shift the main dial operating segments into their operative position and the other one of which serves to shift the parts into position for printing a total of the added numbers.

Fig. 13 is a fragmentary longitudinal sectional elevation taken substantially in line 13—13, Figure 1, and showing the auxiliary adding and recording mechanism.

Fig. 14 is a fragmentary perspective view of the hammer operating mechanism.

Fig. 15 is a fragmentary longitudinal sectional elevation taken substantially in line 15—15, Figure 1, and showing the mechanism whereby the months and days are recorded.

Fig. 16 is a similar section taken in line 16—16, Figure 1, and showing the mechanism whereby the year is printed.

Fig. 17 is a similar section taken in line 17—17, Figure 1, and showing the preferred means for producing vertical ruling on the sheet which receives the record.

Fig. 18 is a longitudinal sectional elevation, taken substantially in line 18—18, Figure 1, and showing particularly the mechanism whereby different parts of the machine may be thrown into and out of gear.

Fig. 19 is a fragmentary perspective view showing the key lever, the main gear segment, the controlling arm and the printing segment of one of the higher columns of numbers.

Fig. 20 is a fragmentary transverse section, taken in line 20—20, Figure 2, and showing the means for adjusting the paper carriage lengthwise of the line of printing.

Fig. 21 is a vertical section, taken substantially in line 21—21, Figure 2.

Fig. 22 is a fragmentary vertical transverse section taken in line 22—22, Figure 2.

Fig. 23 is a fragmentary section taken in line 23—23, Figure 7, and showing the preferred means for producing horizontal or cross ruling on the surface which receives the record.

Fig. 24 is a fragmentary cross section showing the means for connecting one of the main printing segments with its companion duplicate printing segment.

Fig. 25 is a fragmentary perspective view of the units gear segment and controlling arm of the main adding mechanism.

Fig. 26 is a fragmentary detail sectional view showing one of the number keys and adjoining mechanisms.

Fig. 27 is a fragmentary detail sectional view, showing the non-print key and adjacent mechanism.

Figure 28 is a fragmentary elevation of one of the main registering gear segments viewed from the side opposite to that shown in Figures 2 and 7.

Figure 29 is a fragmentary detail view.

Like letters of reference to like parts in the several figures.

*General construction*

Figure 1:
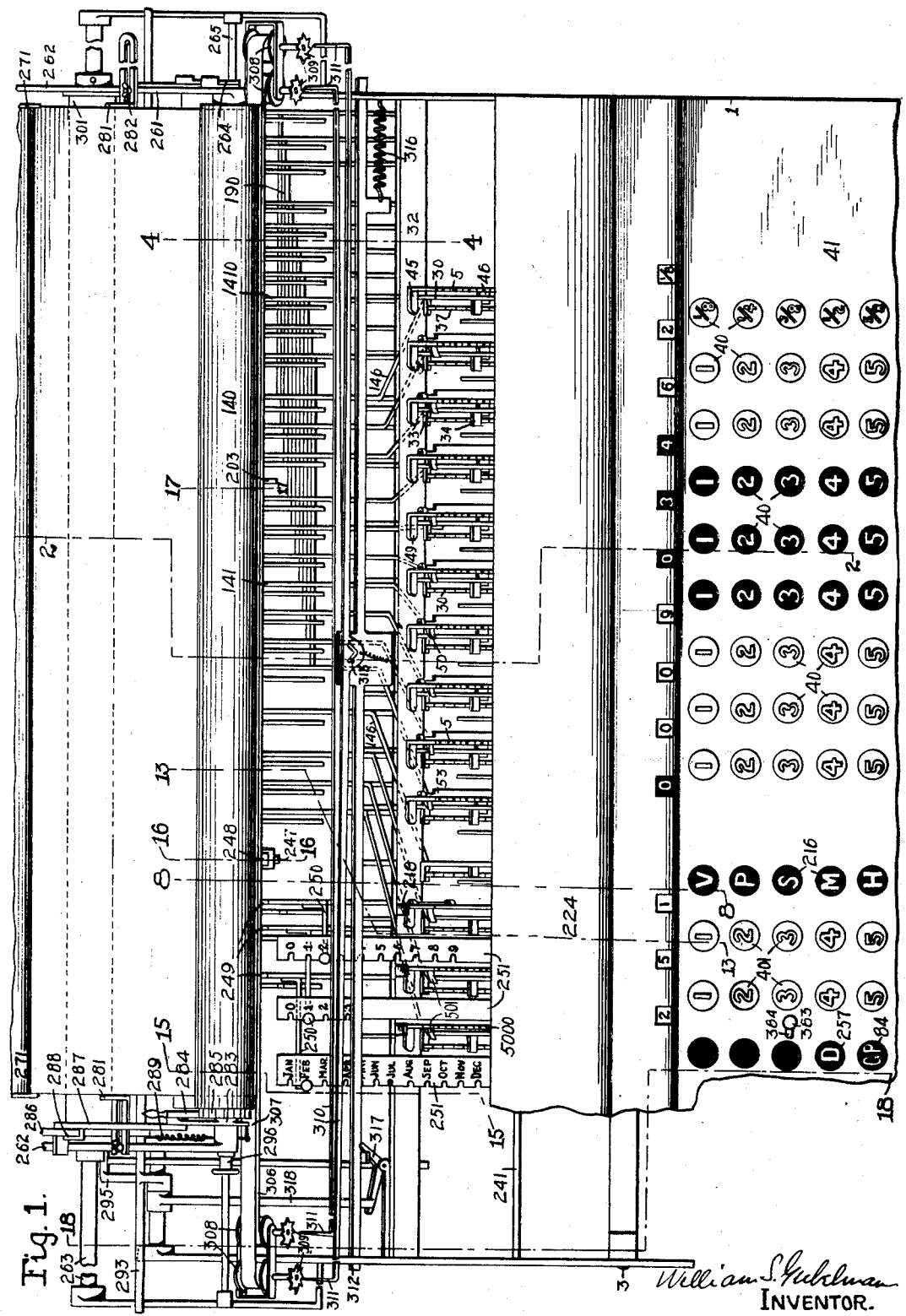
Fig. 1 is a fragmentary top plan view of my improved adding and recording machine.

1 represents the main frame of the machine which may be of any suitable construction so as to support the working parts of the machine.

2, Figures 2, 7 and 13 represents a number of main dials which register the total of the numbers which are added together. These dials consist preferably of cup-shaped wheels which are numbered on their peripheries and are mounted in their proper order on a transverse dial shaft 3, which is journaled in bearings on the main frame, the dials being so arranged that the dial representing the lowest number is arranged on the right hand end of the series and the dials representing the successively higher numbers being arranged successively in their order toward the left from the dial representing the lowest number. The lowest or right hand dial is preferably divided on its periphery into eighths so as to indicate fractions of a cent in eighths, and the remaining dials are graduated on their periphery according to the decimal system into tenths. As shown in the drawings ten total dials are shown and extend from fractions of a cent to tens of millions, but if desired, additional dials may be added to the right and to the left of the series, if it is desired to register smaller divisions of a cent or more than tens of millions. Each of the main total dials 2 is provided on its left hand side with a gear pinion 4, which is rigidly connected therewith, as shown in Figures 2, 7 and 13. The pinion of the fraction wheel has eight teeth while the pinions of the remaining dials are each provided with ten teeth. 5 represents the main registering gear segments, one of which is provided for each of the dials 2 and is adapted to engage with the pinion thereof, for operating the respective dial. Each of these gear segments is arranged in rear of its companion gear pinion and is provided at its lower end with a rearwardly projecting arm 6 which is pivoted loosely on a transverse supporting rod 7. This rod is mounted with its ends on the upper ends of two rock arms 8 which turn loosely with their lower ends on a transverse rock-shaft 9. The rock-arms 8 are connected by a transverse bar 10 which compels the two arms to move back and forth together. In the normal position of the gear segments when the machine is at rest these segments are retracted rearwardly out of engagement with the dial pinions of the dials and the segments are elevated so that their lowermost teeth are opposite the spaces between the adjacent teeth of the dial pinions, these spaces being in line with the pivots of the pinions and the gear segments.

The gear segments are yieldingly held backwardly out of engagement with the dial pinions by means of springs 11 (Fig. 18) connecting the rock-arms 8 with a stationary part of the frame. Figure 18 shows one of the springs 11 connecting one of the rock-arms 8 with a transverse stationary bar 12 in the rear part of the machine. The gear segments are moved forwardly so that their teeth engage with the dial pinions 4, by means of a shifting rock-arm 13, which is preferably secured to the right hand rock-arm 8 and projects rearwardly. Upon raising the shifting rock-arm 13, the rock-arms 8 are swung forwardly and the gear segments 5 are engaged with the dial pinions, while upon swinging the shifting rock-arms downwardly, the rock-arms 8 are swung rearwardly and the gear segments are disengaged from the dial pinions.

14 represents a cam whereby the gear segments are engaged with the dial pinions. This cam is mounted on the upper portion of a vertically swinging rocking frame 15 which is arranged on the right hand side of the machine. This cam is provided at its front end with an incline or cam face 16 and at its rear end with a concentric face 17. When the cam is in its rearmost or retracted position, its incline stands in rear of a roller or projection 18 on the rear end of the shifting arm 13, as shown in Figures 2, 7, 13 and 21. Upon swinging the rocking frame 15, so that the cam 14 moves forwardly, the incline of the latter engages underneath the roller 18 and raises the arm 13, thereby moving the arms 8 forwardly. The throw of the incline 16 is just sufficient to engage the teeth of the gear segments with the dial pinions. When the roller 18 has been raised to the top of the incline, the concentric portion of the cam engages with the roller during the continued forward movement of the cam and the latter does not shift the gear segments any further forward.

When the rear end of the concentric face 17 of the cam passes forwardly from underneath the roller 18, the constant pull of the springs 11 causes the rock-arm 13 to be depressed and the rock-arms 8 to be moved rearward, thereby disengaging the gear segments from the dial pinions. Upon now moving the cam 14 backwardly together with the rocking frame 15, this cam does not affect the arm 13 and the parts connected therewith, but is affected by said arm at the last portion of the backward movement of the cam, at which time the back or lower side of incline 16, engages with the roller 18 which lifts said incline and at the end of the backward movement of the cam, the latter clears said roller and drops behind the same, as shown in Figure 2, preparatory to again raising the roller 18 and connecting parts during the next forward movement of the cam 14.

For the purpose of permitting the front end of the cam to rise so as to clear the roller 18, this cam is pivoted at its rear end to the rear portion of the rocking frame 15. The upward and downward movement of the front end of the cam is limited by means of a lug 19 projecting from the side of the cam and engaging with a slot in the adjacent part of the rocking frame 15 as shown in Figure 21. The rocking frame 15 is secured with its lower portion to a transverse rock-shaft 20 journaled in the main frame and provided outside of the frame with a hand crank 21, as shown in Figure 21, whereby this shaft is rocked and the parts connected, therewith are operated.

The gear segments 5 are raised to their highest position by means of a return or lifting bar 22 which extends transversely underneath all of the arms 6 of the gear segments and which is connected loosely at its rear ends with the transverse rod 7 by lifting plates 23. 24 represents two shifting arms which are mounted loosely at their rear ends on the rock-shaft 20 and which support at their other ends a transverse bar 25 which transverse bar is connected at its ends by two links 26, with the lifting plates 23, whereby upon raising the shifting arms 24, the lifting bar 22 is caused to raise the gear segments and the other parts connected therewith resting on said bar. Upon depressing the transverse bar 25, the lifting bar 22 is moved downwardly and the gear segments resting thereon are permitted to move downwardly with the bar until the segments are arrested.

Each of the gear segments is yieldingly held in contact with the lifting bar 22 by a spring 27 which connects the arm of the segment with the transverse bar 25. If the downward movement of the gear segment is arrested while the shifting arms 24 continue to move downwardly, the lifting bar 22 is moved away from the underside of the arm of the gear segment and the spring 27 is strained. The transverse bar 25 is arranged at one end in a segmental notch 28 formed in the front part of the rocking frame 15, shown in Figures 2, 7, 13 and 21 and its opposite end is arranged in a similar segmental notch 28, formed in a rocking frame 29 (Fig. 21) which is secured to the operating shaft 20 on the left-hand side of the machine. The rocking frames 15 and 29 together with the operating shaft 20 constitute the main or universal operating frame of the machine.

When the machine is at rest, as shown in Figure 2, the transverse bar 25 engages with the front side of the notches 28 in the rocking frames 15 and 29. Upon turning the rocking shaft 20 forwardly, by means of its handle 21, in the direction of the arrow, Figure 2, the rocking frames are moved forwardly during the first part of the movement independent of the transverse bar 25. The latter remains at rest until the inclined front end 16 of the cam 14 has raised the arm 13 and moved the gear segments into engagement with the dial pinions, during which movement the rocking frames move idly the extent of their notches 28 along the ends of the bar 25 without disturbing the latter. After the gear segments have been engaged with the dial pinions, the continued forward movement of the rocking frames causes the rear ends of their notches 28 to engage with the bar 25 and depress the same, thereby causing the lifting bar 22 to be moved downwardly and strain the springs 27. This causes all of the gear segments which are free, to be moved downwardly and to continue their downward movement until they are arrested. During the downward movement of the gear segments, while they are in engagement with the dial pinions, the latter and the dials connected therewith are turned in the direction of the arrow, Figure 7, until the downward movement of the segments is arrested. The extent which each dial is turned depends upon the position in which the downward movement of its operating segment is arrested. After the segments have been arrested in their downward movement, they remain in this position while the rocking frames complete their forward movement. At the end of the forward movement of the rocking frames, the roller 18 of the rock arm 13 drops off from the rear end of the concentric part of the cam 14, thereby allowing the springs 11 to pull the gear segments rearwardly out of engagement with the dial pinions.

Upon now turning the rock-shaft 20 backwardly by means of the handle 21, the rocking frames are moved, backwardly, until the front ends of the notches engage with bar 25. When the latter is so engaged it is moved backwardly with the rocking frames to the end of their rearward movement which causes the transverse bar 25 to lift the lifting bar 22 and the gear segments which have been depressed into their highest or normal position. During this upward movement of the depressed gear segments they are out of engagement with the dial pinions, so that the dials are not turned backwardly with the segments, but remain in their shifted position. 30 represents a number of elbow-shaped controlling arms, which form part of the devices whereby the downward movement of the registering gear segments is controlled. One of these arms is arranged along the left-hand side of each gear segment and consists of an upright front part and a horizontal lower part which extends rearwardly from the lower end of the upright part, thereby leaving a clear space in rear of the upright part of the controlling lever, as represented in Figures 1, 2, 7, 13 and 19. The rear end of the lower part of each controlling arm is mounted loosely on a transverse supporting bar 31, while the upper end of its front or upright part is loosely connected with the upper portion of its companion gear segment. This loose connection permits the controlling arm and the gear segment to swing freely about their individual axes, which are arranged parallel but out of line, and also permits the gear segment to move forward and backward into and out of engagement with its companion dial pinion. In the uppermost position of the controlling arms the same bear with their upper ends against a transverse stop bar 32, as shown in Figure 2, which limits the upward movement of these arms. Each controlling arm is provided on the rear part of its upper end with a locking lug 33, and on the front part of its upper end with a stop lug 34, both of which lugs project toward the left and are preferably stamped out in one piece with the controlling arm.

The operation of the registering devices is controlled by a number of elbow-shaped key levers which are arranged side by side and pivoted to a transverse supporting rod 35. Each key lever is provided with a lower actuating arm 36, which projects forwardly, and an upper stop arm 37 which projects upwardly along the left hand side of one of the controlling arms and gear segments, as represented in Figures 2, 7 and 19. Each of these key-levers is provided on the rear side of its stop arm with a locking shoulder 38 which is adapted to engage with the locking lug 33 of the controlling arm when the latter is elevated into its highest position and the key-lever is in its fully retracted position, as shown in Figure 2. When the parts are in this position, the key lever holds the controlling arm against downward movement and the latter holds the gear segment against downward movement. If the gear segment while so held against downward movement is moved forward into engagement with the adjacent dial pinion, and the rocking frames are turned forwardly for depressing the gear segment, the spring 27 of this segment will be strained without however, shifting the segment. At the end of this forward movement of the rocking segments, the roller 18 of the rock arm 13 drops off from the rear end of the cam 14, the gear segment is moved rearwardly out of engagement from the dial pinion and then the rocking frames move backwardly without having shifted the dial.

The upper arm of each key lever is provided on its front side with a vertical series of differential stop shoulders 39, which are arranged step fashion and extend from the upper end of this arm downwardly and forwardly thereon or in other words the stop shoulders 39 are arranged radially out of line with one another and different distances from the pivot of the key lever. These stop shoulders of the key lever are adapted to be moved forwardly into the path of the stop lug 34 on the controlling arm. The stop shoulders are arranged different distances from the stop lug 34 of the controlling arm, so that by moving different stop shoulders of the key lever into the path of the stop lug of the controller arm, the latter and the gear segment connected therewith may be arrested at different points in their downward movement. The uppermost stop shoulder of the key lever is most remote from the stop lug of the controlling arm and therefore requires the greatest forward movement of the key lever, in order to bring this stop shoulder into the path of this stop lug.

The stop shoulders of the key lever are so arranged that the distance from the stop shoulders to the path of the stop lug gradually grows less from the uppermost stop shoulder to the lowermost stop shoulder. The relative position of the different stop shoulders of the key lever is such that when its locking shoulder 38 remains in engagement with the locking lug 33 and the gear segment is simply moved into and out of engagement with its dial pinion, the latter remains at zero, if the same has not been previously moved. But when the key lever has been moved forwardly, so as to disengage its locking shoulder from the locking lug and moves one of its stop shoulders into the path of the stop lug of the controlling arm, the latter arm and gear segment connected therewith will be moved downwardly upon moving the rocking frames forwardly, until the stop lug of the controlling arm strikes the respective stop shoulder of the key lever which stands in its path, as represented in Figure 7, whereby the gear segment while turning in engagement with the adjacent dial gear pinion turns the same forward. By turning the key lever forward more or less and moving one or the other of its stop shoulders into the path of the stop lug 34 of the controlling arm, the distance which this arm descends can be varied, thereby varying the number of spaces which its gear segment turns the adjacent dial.

Main number key mechanism 40 represents the main keys whereby the key levers of the main registering and recording mechanism are operated, and which are guided with their depending stems in the top 41 and bottom 42 of the key-board. As shown in the drawings, nine longitudinal columns of these keys are arranged transversely side by side. The first column on the right-hand side of the machine contains seven keys and represents fractions of one-eighth of a cent, the next column toward the left contains nine keys and represents cents and the remaining columns of keys toward the left each contains nine keys and represents progressively higher orders of numbers according to the decimal system, so that the registering keys in the last or left hand column represent hundreds of thousands of dollars.

The lowest numbers of the several columns of keys are arranged transversely in a row on the rear part of the key-board and the corresponding higher numbers of the several columns are arranged likewise in transverse rows and progressively in their order toward the front end of the key-board.

Each of the registering keys is yieldingly held in an elevated position by a spring 43 (Figs. 26 and 27) surrounding the stem of the key and connected at its upper end to the key and bearing with its lower end against the bottom of the key-board. The upward movement of each key is limited by a shoulder 44 formed on the upper part of its stem and engaging with the underside of the top of the keyboard, as represented in Figure 26.

The downward movement of all of the keys is substantially the same, but the arrangement of each column of keys lengthwise of the lower actuating arm of each key lever causes the keys to bear against their lever at different distances from its pivot, so that by depressing different keys the same distance, the key lever will be turned different angular distances. The keys having the lowest numbers bear against their respective key levers nearest the pivot and consequently the levers are thereby thrown the greatest distance, and the uppermost stop shoulders are shifted into the path of the stop lug 34 of the respective controlling arms. The throw of each key lever upon depressing any one of its keys is so adjusted, that the proper stop shoulder on its upper arm is moved into the path of the stop lug 34 of the controlling arm, and the downward movement of the respective gear segment is arrested after having turned the adjacent dial gear pinion a number of spaces corresponding to the number of the key which is depressed.

Loose connection for segments

The loose connection between each controlling arm and its gear segment, heretofore referred to, is shown in its simplest form in the connection between the controlling arm and the gear segment, which are controlled by the initial or lowest column of registering keys. As shown in Figures 1 and 25, the loose connection between the controlling arm and the gear segment of the lowest registering devices consists of upper and lower guide lugs 45 and 46 arranged on the upper end of the segment and bearing against the upper and lower guide faces 47 and 48, which are formed on the upper end of its companion controlling arm. As the controlling arm and segment rise and fall, the guide lugs of the segment slide back and forth on the guide faces of the arm. The guide faces are so constructed that the back and forth movement of the segment on the arm is radial with reference to the dial pinion in all positions of the segment. By so forming the guide faces of the arm, the gear segment can be engaged with and disengaged from the dial pinion in all positions of the segment without disturbing the position of the dial pinion. The construction of the loose connections between the controlling arms and gear segments of all of the higher registering devices above the fractional registering device are combined with carrying devices, whereby each registering dial, upon making one complete turn, causes the next higher dial to be turned forward one space, thereby carrying up a number from one order to the next higher order. The loose connections between the controlling arms and the segments and the carrying mechanism of the higher registering devices are constructed as follows:

As shown in Figures 1, 2 and 7, each controlling arm is provided at its upper end with upper and lower guide faces 47 and 48 and its lower guide face is engaged by a lower guide lug 46 on the adjacent gear segment, the same as in the coupling between the controlling arm and segment of the initial registering device. The gear segments of the higher registering devices are each provided with an upper guide lug 49 which is adapted at times to bear against the upper guide face 47 of the companion controlling arm in substantially the same manner in which the upper guide lug 45 of the fractional gear segment bears against its companion arm, the only difference being that the upper guide lugs 49 of the higher gear segments are held out of engagement and separated by a space from the upper guide face of the companion arm when no number is carried from a lower to a higher registering device. The upper guide lug 49 is held in this elevated position above the adjacent guide face by a rocking latch 50 which is arranged in a notch in the rear side of the gear segment and which normally projects toward the left and engages with the upper guide face 47 of the adjacent controlling arm, as shown in Figures 2 and 19.

During the ordinary up and down movement of each higher controlling arm and gear segment, the latter is guided by its lower guide lug 46 and the locking latch 50 engaging with the lower and upper faces of the adjacent arm, this movement being the same as the movement of the controlling arm and gear segment of the fractional registering device. Normally the downward movement of the controlling arm is determined by the position of its companion key lever and this arm in turn controls the extent of the downward movement of the gear segment. When, however, the locking finger 50 is withdrawn out of engagement from the upper guide face 47 of the arm, the companion gear segment is capable of moving downward independently of the arm until the upper guide lug 49 engages with the upper guide face of the arm. The extent of this independent movement of the gear segment with reference to its companion arm is equal to one tooth or space of the segment, so that by this means the gear segment is enabled to turn the dial pinion one space more than the position of the key lever permits the same to move.

The withdrawal of the locking latch of each higher registering device is controlled by the next lower registering device and the withdrawal of each latch is effected when the next lower registering device has made one complete turn and arrived at zero. Each of the locking latches is pivoted on the right hand side of its adjacent gear segment, so as to turn transversely with reference to the latter. The latch is turned toward the left into its operative position by a spring 51, (Fig. 28) the movement in this direction being limited by a shoulder 52 arranged on the latch and bearing against the right hand side of the gear segment. 53 (Fig. 1) is an upright trip plate connected with the lower end of each latch and arranged normally at right angles or nearly so to the adjacent gear segment, when the latch is in its operating position. 54 represents a number of upright trip arms, each of which is controlled by a lower registering device and which turns the locking latch of the next higher registering device into an inoperative position. This arm is mounted loosely with its lower end on the supporting bar 35 and is provided at its upper end with a rearwardly and then forwardly projecting hook 55, and in front and below said hook with a bend forming a bearing finger 56. 57 represents trip cams arranged on the left-hand side of each registering dial pinion and connected with the adjacent pinion and dial, but separated from the pinion by an intervening space or groove. The face of each of these cams may begin at its lowermost point near the axis thereof and then extend outwardly in a spiral line terminating with its highest point in line with its lowermost point with which it connects abruptly and radially. The trip cam of the fractional registering device has its face divided into eight parts, each part of which except the first is arranged one-eighth of a space further from the center of the cam than the preceding part, while the trip cams of the higher registering devices each has its face divided into ten parts, each part except the first being arranged one tenth of a space farther from the axis of the cam than the preceding part. Each of the trip arms 54 extends upwardly along the right-hand side of the trip cam of a lower registering device, and its shoulder 56 engages with the face of this cam, while the hook 55 at its upper end extends toward the left and is adapted to engage with the trip plate 53 of the next higher registering mechanism. In the initial position of each trip arm, its shoulder 56 engages with the lowest part of its trip cam, as represented in Figures 2 and 13. As the trip cam is turned in the direction of the arrow, Figure 2, at the same time that its dial and gear pinion are moved forwardly by the adjacent gear segment, during the adding operation, the trip arm is moved backwardly by the gradually rising face of the trip cam. During this backward movement of the trip arm, its hook engages with the trip plate 53 of the next higher registering device and is deflected toward the right thereby, the hook being sufficiently elastic for this purpose. After the hook has passed in rear of said trip plate, the hook owing to its resilience springs back to its normal position, so as to stand behind said trip plate. When the shoulder of the trip arm reaches the highest part of the face on the trip cam the trip arm has been shifted to its rearmost position. Upon now turning this cam forwardly another space together with its companion dial and pinion, the highest part of the cam is carried from underneath the shoulder of the trip arm and the latter is moved forwardly over the abrupt face of the cam until its shoulder 56 again engages with the lowest part of the cam face. During this movement of the trip arm, its hook strikes the rear side of the trip plate 53 of the next higher registering mechanism and turns the same forwardly thereby disengaging the locking latch from the adjacent controlling arm and permitting the gear segment carrying the trip plate to move forward one space. The forward movement of the trip arm is effected when the dial with which its trip cam is connected has made one complete rotation and again stands at zero, whereby the addition represented by this complete rotation is carried to the next higher registering device. The forward movement of the trip arm is effected quickly by a spring 58, which connects with a stationary cross bar 59 arranged in front of the trip arms. The trip plate 53 of each registering device is so arranged and is of such length that the hook of the next lower trip arm can engage with the rear side of the plate, for disengaging its latch in any position of the gear segment carrying the plate, and in order to accomplish this engagement it is obvious that cams 57 should be constructed so as to give arms 56 the proper throw. If a gear segment is locked in its highest position by reason of none of its companion keys having been depressed, the withdrawal of its latch from the controlling arm simply permits the gear segment to drop one space and turn its companion dial pinion forward one space, while in engagement therewith, the movement of this dial representing one number carried up from the next lower dial. If any one of the keys of the key levers has been depressed, so as to release the gear segment and permit the same to move downwardly for effecting an addition, and if during this time the next lower registering device has made a complete turn, so as to require the carrying up of a number from the next lower registering mechanism, the latch of the higher registering device will be withdrawn while the same is effecting its addition, thereby causing the segment to descend and turn its dial one space in addition to the spaces corresponding to the depression of its respective key.

When the locking latch has been withdrawn so as to permit a gear segment to move downwardly one space farther than its controlling arm, the latch remains in this position during the subsequent upward movement of the arm and the segment until the upward movement of the arm is arrested by striking the stop bar 32 and the gear segment continues its upward movement independent of the arm the extent of one space. The gear segment has now reached its highest position, and its latch is again swung automatically by its spring, over the controlling arm. The controlling arm and gear segment now remain in this relative position until another number is to be carried up from the next lower registering device.

When the controlling arm has been retracted to its highest position, the adjacent key lever is moved into its normal retracted position, so that its locking shoulder 38 engages with the locking lug 33 of the controlling arm and locks the latter against downward movement. The return movement of each key lever is preferably effected by a spring 60 which connects the upper arm of the key lever with the transverse shaft 9, as shown in Figures 2 and 7 or with some other convenient part of the machine. The lower guide lug of the gear segment is not absolutely necessary because the weight of the parts connected with the controlling arm and arranged in rear of its pivot is sufficient to raise the arm, but it is preferable to employ this lower guide lug 46 on the gear segment because it compels the arm to rise with the gear segment and avoids displacement of these parts with reference to each other, and also serves as a stop to limit the upward movement of the gear segment.

The gear pinion and the co-operating gear segment of the fractional registering device are so constructed that the fractional dial makes one rotation whenever it is moved forward eight spaces. After the fractional dial has made one rotation the whole number represented by this rotation is transferred by the first carrying device from the registering mechanism of the fractional dials to the next higher registering device which represents cents. The complete turns of each of the following registering devices are in like manner carried or transferred to the next higher dial by the respective carrying device. The dial which records the highest number, in this instance the millions of dollars is preferably operated only by the adjacent carrying device of the next lower dial and is incapable of being operated directly from the key-board because it is not provided with a key operating mechanism.

The mechanism whereby the dials are all turned back to zero or the place of beginning after the addition of numbers has been completed is constructed as follows:

61 (Figs. 2 and 7) represents a series of feeling rock levers which are adapted to shift the key levers, so as to permit the gear segments to descend the proper distance for resetting or restoring the main registering dials to zero. One of these shifting levers is mounted loosely on the supporting bar 35 adjacent to the left hand side of each of the key levers and is provided on its upper arm with a forwardly projecting feeling finger 62 and with a shifting finger 63 which extends behind the upper arm of the adjacent key lever. The feeling levers have their fingers arranged in rear of the total cams 57, and each of these levers is turned, so that its upper arm moves backwardly by the upper arm of the adjacent key lever engaging with the shifting finger 63 of the feeling lever. 64 represents a transverse pull bar arranged in rear of the lower arms of the feeling levers and connected with each of the latter by a pull spring 65, as represented in Figures 2, 7 and 21. This pull bar is connected at its ends to the lower ends of two depending pull or rock arms 66, which are secured at their upper ends to the rock shaft 9, as shown in Figure 21. Upon turning this rock-shaft, so as to swing its depending pull arms backwardly the feeling levers are turned by means of the springs 65 so as to move the upper arms of these levers forwardly. This movement of the rock-shaft 9 is effected by a cam 67, (Figs. 18, 21 and 22) which is mounted on the left-hand side of the rocking frame 29 and which is constructed substantially the same as the cam 14 which is mounted on the rocking frame 15. As shown in Figures 18 and 22, this cam is pivoted near its rear end by a transverse pin, to the rear portion of the rocking frame 29 and is provided at its front end with an incline or cam face 68 and in rear of the incline with a concentric face 69. The cam 67 is pivotally supported on the rocking frame 29 in the same manner in which the like cam 14 is pivoted on its corresponding rocking frame 15. The cam 67 can be raised and lowered with its front end into an inoperative or operative position, this movement being limited by means of a lug 70 arranged on the cam as shown in Figure 21, and projecting into a slot 71 in the adjacent rocking frame in the same manner in which the movement of the cam 14 is limited.

72, Figures 18 and 21, represents a rearwardly projecting rock-arm secured to the rock shaft 9 and provided at its rear end with a roller or projection 73 which is adapted to be engaged by the cam 67 for turning the rock shaft 9. When numbers are being added with the machine, the cam 14 is depressed, as shown in full lines, Figure 2, so as to be in a position when moved forwardly by the rocking frame 15 to engage the roller on the arm 13, for moving the gear segments into engagement with the dial pinions, and during this time the cam 67 is lifted into the position shown in full lines, Figure 18, so that when the rocking frame 29 is moved forwardly the cam 67 will clear the roller 73 of the rock arm 72 and not disturb the rock-shaft 9 and the parts connected therewith.

If it is desired to restore all of the dials 2 to zero, the cam 14 is raised into its inoperative position, shown by dotted lines 14 in Figure 2, and the cam 67 is lowered into its operative position, as shown by dotted lines 67ᵃ in Figure 18. Upon now turning the rock-shaft 20 by hand so as to move both rocking frames 15 and 29 forwardly, the cam 14 passes over the roller 18 of the arm 13 without disturbing the same, but the inclined front of the cam 67 engages with the roller 73 on the rear end of the rock-arm 72 and raises the same until this roller engages with the concentric part 69 of this cam. By this movement of the arm 72, the rock shaft 9 is turned in the direction for moving its depending arms 66 rearwardly and pulling the springs 65 rearwardly. This pull on the springs 65 causes the feeling levers to be turned until the feeling fingers of their upper arms engage with the spiral surfaces of the trip cams. After the feeling fingers bear against these cams, their movement is arrested and the continued backward movement of the pull bar 64 simply stretches the springs 65 until the bar reaches the end of its backward movement. The feeling finger of each feeling lever engages with that part of the surface of the adjacent trip cam which is directly opposite the feeling finger, and as these trip cams are turned with the adjacent dials they present different parts of their spiral surfaces to the opposing feeling fingers, which causes the forward movement of the upper arms of the feeling levers to be arrested in different positions when swung forwardly. During the forward movement of the upper arm of each feeling lever, its shifting finger 63 engages with the rear side of the upwardly projecting arm of the adjacent key lever and moves this arm forwardly. The construction of the parts is such that the spiral surfaces of the trip cam bears a definite relation to the step-shaped series of stop shoulders on the upper arm of the key lever. When the feeling finger of the feeling lever, upon being moved forwardly, bears against the lowest key lever stop controlling part of the adjacent trip cam, the adjacent key lever is carried simultaneously forward with the feeling lever the greatest distance and its uppermost stop shoulder is carried into the path of the stop lug of the controlling arm. The succeeding parts of the spiral surface of the trip cam are so constructed that they rise progressively higher and arrest the forward movement of the feeling lever when the same has carried the adjacent key lever with its corresponding stop shoulder into the path of the stop lug of the controlling arm. This forward movement of the feeling lever and that of the upper arm of the key lever is gradually reduced as the progressively higher parts of the trip cam are presented to the feeling finger, and when the highest part of the trip cam is presented to the feeling finger, the feeling lever is prevented from moving forward at all and the upper arm of the key lever is not moved with its locking shoulder out of engagement with the locking stop of the controlling arm and consequently the companion gear segment connected therewith is held against downward movement. After the rocking frames 15 and 29 have been turned forwardly sufficiently to engage the several feeling fingers of the feeling levers with their respective trip cams, the rear ends of the segmental notches 28 in the rocking frames engage with the cross bar 25 and depress the same, thereby moving the lifting bar 22 downwardly and at the same time pulling down the springs 27. This downward pull on these springs causes each spring to pull its respective gear segment down as far as possible, and after the downward movement of the segment has been arrested the continued downward movement of the cross bar 22, together with the rocking frames simply stretches these springs until this bar reaches the end of its downward movement. If a gear segment is locked in its uppermost or zero position its spring 27 will be stretched its fullest extent, whereas, if a gear segment moves downwardly more or less before it is arrested by its shifted key lever, its spring 27 will be stretched less in proportion. This downward movement of the gear segments which are free to move in this direction takes place while the gear segments are in their retracted position and out of engagement from the dial pinions, so that the dials are not affected by this movement of the segments.

After the rocking frames have reached the end of their forward movement and the roller 73 has dropped off from the rear end of the concentric portion 69 of the cam 67, the gear segments are moved forwardly by hand operated mechanism into engagement with their respective dial pinions and are held in this position during the entire subsequent backward movement of the rocking frames, which is effected by hand operated mechanism. During the backward movement of the rocking frames, the gear segments are raised to their highest positions, while in engagement with the dial pinions by the rod 22 and connecting parts and turn the dials backwardly. At the end of the upward movement of the gear segments the latter are released, so as to permit them to move into their retracted position, out of engagement from the dial pinions.

During this operation, those gear segments which are held or locked in their highest positions, by reason of their dials being at zero, are simply moved forward at the end of the forward movement of the rocking frames, so as to engage with their respective dial pinions and are again moved backwardly out of engagement therefrom at the end of the forward movement of the rocking frames, without disturbing their respective dials. Each of the unlocked gear segments is moved downwardly a number of spaces corresponding to the number which is registered on its dial, the extent of this movement being controlled by the companion trip cam which arrests the forward movement of the key lever, through the medium of its feeling lever, when the proper stop shoulder of the key lever has been presented to the controlling arm.

Upon now moving the gear segments forwardly in their variously depressed positions and then raising them to their highest position, each depressed gear segment will turn its dial backward the same number of spaces that the gear segment was depressed. Inasmuch as each gear segment was permitted to descend by its trip cam, feeling lever and key lever the same number of spaces as the number indicated on its dial, the gear segment subsequently moves upwardly the same number of spaces before reaching its highest position, thereby turning its dial backwardly the same number of spaces and restoring the same to zero. When all of the dials have been returned to zero, the shoulders 56 of all the trip arms engage with the lowest parts of all of the trip cams 57. The cams 14 and 67 are provided with a longitudinal slit 74, as shown in Figure 12, so as to facilitate the manufacture of these parts.

The mechanism whereby the positions of the cams 14 and 67 are reversed preparatory to restoring the dials to zero is constructed as follows:

The cams 14 and 67 drop into their operative position by gravity. Each of these cams is provided in rear of its pivot with a tail 75 which is depressed when it is desired to lift the respective cam into its inoperative position.

76 is a shifting lever which is pivoted at its lower end and is normally turned so that its upper end is disengaged from the rear side of the tail on the cam 14, by a spring 77, as shown in Figures 2 and 7. The member 76 projects in rear of the main frame so as to be accessible for manual operation. 78 (Fig. 18) is a shifting lever which is pivoted between its upper and lower arms and arranged with its upper arm in rear of the tail on the cam 67 and normally held in engagement therewith by a spring 79, as shown in that figure. 80 represents an elbow lever pivoted below the bottom of the keyboard, as represented in Figure 18. 81 represents a main line or cord which is connected with the lower arm of the elbow lever 80 and which is provided at its rear end with two branches 82 and 83. The branch 82 connects with the shifting lever 76 above its pivot, and the branch 83 connects with the shifting lever 78 below its pivot. 84 represents a total or shifting key having a depending stem which is guided in top and bottom plates of the keyboard and which bears with its lower end against the upper arm of the elbow lever 80. Upon depressing the key 84, the elbow lever 80 is turned, so as to draw the cords or lines 81, 82 and 83 forwardly, thereby moving the upper end of the shifting lever 76 into engagement with the tail of the cam 14 and lifting the same into an inoperative position, while the shifting lever 78 is moved rearwardly with its upper arm from the tail of the cam 67, thereby allowing the latter to drop into its operative position. Upon depressing the gear segments while the parts are in this shifted position, the segments move downwardly out of engagement with the dial pinions. After the gear segments have been depressed, they are moved forwardly into engagement with their respective dial pinions by an elbow lever 85 which is connected with its lower arm by a line or cord 86 to the rod or bar 7, as shown in Figure 18, or to one of the rock arms 8. The elbow lever is turned in the proper direction for this purpose by a shifting key 87 having a depending stem which is guided in the top and bottom of the key-board and which bears against the upper arm of the elbow lever 85. After the gear segments have been moved forwardly into engagement with the dial pinions, while in the depressed position, the gear segments are retained in forward position, and at the same time raised until they reach their uppermost position, whereby the dials are turned to zero. The shifting key 87 is now released which permits the spring 11 to move the gear segments rearwardly out of engagement with the dial pinions. The key 84 is also released, thereby permitting the shifting levers 76 and 78 to resume the positions shown in Figures 2 and 18, leaving the machine in position to resume adding.

Each of the dials is held against turning while out of engagement from its gear segment, by means of a detent pawl 103 which engages with the front side of its companion gear pinion, as shown in Figures 2, 7 and 13. The pawls 103 of the several gear pinions are mounted on a transverse pawl bar 104, which is supported at its ends by means of two pawl arms 105, which turn loosely upon the supporting rod or bar 35 of the key levers. The pawl arms are moved rearwardly for engaging the pawls of the bar 104 with the gear pinions by means of springs 106 (Fig. 18). These springs are connected loosely at their rear ends to the rock-shaft 9 and at their front ends to the pawl arms 105. During the forward movement of the gear segments preparatory to turning the dial pinions, the detent pawls are swung forwardly out of engagement with the dial pinions by means of two shifting rods 107 which are connected at their rear ends to opposite ends of the transverse rod 7 or some part moving therewith and each of which is provided at its front end with a fork or bifurcation 108, which engages with a pin or shoulder 109 on the pawl arm arranged on the adjacent side of the machine. As the gear segments move forward into engagement with the gear pinions the shifting rods 107 move the detent pawls 103 out of engagement with the dial pinions, and when the gear segments move backwardly the detent pawls are again engaged with the dial pinions by the springs 106.

Recording mechanism

For the purpose of recording the numbers which are added together by the above described mechanism a recording mechanism is provided which is constructed as follows:—
140 (Figs. 1, 2, 18, etc.) represents a printing roller or platen which is arranged transversely in the upper rear part of the machine and under the lower side of which the sheet or other article is placed which receives the record. 141 represents a number of type segments which are arranged transversely side by side below the platen and which are pivoted at their front ends to the supporting bar 31 upon which the rear ends of the controlling arms 30 are pivoted. Each of these type segments is provided at its rear end with a segmental row of type carriers 142, which are capable of moving radially back and forth on the type segment.

Each of the type carriers is provided at its rear end with a type and is guided upon the type segment by means of screws or rivets 143 (Figs. 9 and 10) secured to the type carrier and arranged in radial slots 144 formed in the type segment, as shown in Figures 2 and 3. Each of the type carriers is held in its inward or retracted position by means of an S-shaped spring 145, which is arranged between the carrier and the type segment and is secured with one end to the carrier and with its other end to the type segment. Upon raising or lowering the type segment any one of its type can be brought to the printing point or line, and upon striking the back or inner end of the type carrier, when the same is in line with the printing point the type carrier will be driven outwardly and its type will produce an impression on the sheet supported by the platen. After the carrier has received the blow for driving the same against the platen, the carrier is again quickly retracted to its innermost position by means of its spring.

Each of the type segments is connected with one of the controlling arms, so that upon depressing a controlling arm and the registering gear segment connected therewith, the companion type segment will be raised and present one of its type to the printing point.

For convenience in operating the machine, the keys are separated a considerable distance on the key-board and in order to produce a compact record, the printing segments are arranged closer together than the keys and the registering mechanism. In order to permit of this arrangement, each type segment and its corresponding controlling arm are connected by a connecting arm 146, as represented in Figures 1, 2 and 19. The connecting arms of the central controlling arms and type segments are comparatively straight, but the connecting arms of the outer type segments and controlling arms are arranged obliquely, the degree of this obliquity gradually increasing from the central type segments and controlling arms in opposite directions toward the outer type segments and controlling arms, as represented in Figure 1. The connecting arms 146 of the outer controlling arms are arranged in the spaces behind the upright parts and above the horizontal parts of the controlling arms, thereby permitting the inner controlling arms to move up and down without interfering with the connecting arms 146 of the outer controlling arms.

The types on each type segment are arranged to correspond with the teeth and numbers of its companion gear segment and registering dial, the zero type being at the upper end of the series and the progressively higher digits arranged in their order downwardly from the zero type. When the registering gear segment is in its highest position, it presents its zero tooth to the dial pinion and the type segment which at this time is in its lowest position presents its zero type to the printing point. Upon depressing a gear segment so as to present one of its higher teeth to the dial pinion, its companion type segment is raised proportionally and presents a corresponding higher numbered type to the printing point.

147 represents a number of hammers whereby the type carriers are struck for driving the type against the platen. One of these hammers is arranged adjacent to each type segment and is provided with a head which is arranged in front of the series of types and in line with the printing point of the platen. Upon shifting the type segment so as to bring one or another of its type carriers to the printing line and then operating the hammer, the latter delivers a blow against the inner end of the particular carrier which is at the printing point and produces an impression of its type on the platen. The several hammers are pivoted on the transverse rod 12 arranged in rear of the segments and each of the hammers is yieldingly held in its forward position by a spring 148 connected at its lower end to a cross bar 149 and at its upper end to a depending arm 150 on the hammer.

151 represents a vertically movable trip bar or rod which is arranged transversely below the hammers and whereby the latter are operated. This bar is supported at its ends upon the rear end of rock arms 152 which turn loosely with their front ends on the rod 31 supporting the type segments and controlling arms.

153 represents a number of hammer or trip pawls; whereby the hammers are retracted preparatory to delivering a blow against the type carriers which are at printing point. One of these pawls is arranged adjacent to each hammer and pivoted loosely at its lower end to the trip bar 151, and its upper end is provided on its rear side with a downwardly facing hook or shoulder 154, and above said shoulder with a trip face 155, as shown in Fig. 14. Each of the hammers is provided in front of its pivot adjacent to the upper end of the hammer pawl with a lower trip lug or shoulder 156 and an upper trip lug or shoulder 157. When the parts are at rest, the hammer pawl 153 is raised into its highest position and the hammer is in its normal position with its lower trip lug 156 below and in rear of the hook of the hammer pawl and with its upper shoulder 157 in rear of the trip face of the hammer pawl, as represented in Figures 2 and 3.

Upon shifting the hammer pawl rearwardly, while the parts are in this position, so that its hook overhangs the lower shoulder 156 of the hammer, and then pulling the hammer pawl downwardly, the hook of the hammer pawl engages with the lower shoulder of the hammer and turns the same so that its head is retracted from the type carrier at the printing line. As the hammer moves downwardly with the hammer pawl, the upper shoulder of the hammer comes into engagement with the trip face of the hammer pawl and during the continued downward movement of the hammer and its pawl, this upper shoulder gradually crowds the hammer pawl forwardly with reference to the hammer, by reason of the hammer and its pawl swinging on different centers. During the last portion of the downward movement of the trip bar 151 and the hammer pawl mounted thereon, the pawl is crowded forwardly by the upper shoulder 157 of the hammer to such an extent that its hook is disengaged from the lower shoulder 156 of the hammer, thereby liberating the latter and permitting its spring 148 to throw the same quickly and deliver a blow against the type carrier at the printing line. The trip bar 151 now rises and carries the hammer pawl into its highest position, preparatory to again engaging the hammer for depressing the same.

158 (Fig. 3) represents a number of upright shifting arms whereby the hammer pawls are moved rearwardly, so that their hooks engage with the lower shoulders of the hammers. One of these arms is arranged adjacent to each hammer pawl, as shown in Figures 3 and 6, and is pivoted at its lower end on the trip bar 151, and its upper end is provided with a roller or projection 159 which bears against a hammer cam 160 on the lower part of the adjacent type segment, as shown in Figures 3 and 7. This hammer cam is provided at its upper end with a receding or low portion, an inclined portion arranged below the low portion and a concentric or high portion arranged below the inclined portion. Each shifting arm 158 is moved forwardly and its roller is yieldingly held in engagement with the adjacent hammer cam by a spring 161 connecting said arm with a cross bar 162 secured to the rock arms 152, as represented in Figures 7 and 8. The backward movement of each hammer pawl with reference to its companion shifting arm, is limited by means of a stop 163 secured to the upper portion of the hammer pawl and engaging with the front side of the shifting arm, as represented in Figures 3, 5 and 14.

Each hammer pawl is yieldingly held in its rearmost position with reference to its shifting arm by means of a C-shaped spring 164 secured with its ends, respectively, to the hammer pawl and its shifting arm, as shown in Figures 2, 3 and 14. In the lowermost position of a type segment, the receding part of its cam is presented to the roller of the shifting arm 158, which permits the hammer pawl to be retracted into its foremost position, as represented in Figure 3. Upon depressing the trip bar 151 when the parts are in this position, the roller 159 is not engaged soon enough by the incline of the cam 160 to engage the hook of the hammer pawl with the lower shoulder of the hammer, before the hook has passed below this shoulder, but instead the trip face of the hammer pawl slides idly against the shoulder 156 without retracting the hammer, whereby no impression of the particular type at the printing line is produced. If the type segment is raised, so as to present one of its lower types to the printing point or line, the incline of its cam during the first part of the upward movement of the segment moves the shifting arm 158 rearwardly together with the hammer pawl, yieldingly connected therewith, so that the hook of the hammer pawl stands over the lower shoulder 156 of the hammer. Upon now depressing the pawl 153 the hammer will be retracted and released near the end of the downward movement of the pawl and will be quickly swung up by the spring 148, thereby delivering a blow against the type at the printing point and producing an impression thereof. The incline 160 of the type segment cam is so constructed that it throws the hammer pawl backwardly into an operative position when the segment is raised one digit space, and during the continued upward movement of the segment, the hammer pawl is held in this operative position by the high concentric part of the segment cam. By thus constructing the type segment cam, its companion hammer pawl is not shifted when the segment is not raised and its zero type remains at the printing line, but the hammer pawl is shifted into an operative position for producing an impression, if the type segment is raised one or more digit spaces and presents any one of its digits higher than zero to the printing line.

Automatic printing of zero 165 (Figs. 7 and 22) represents a number of transfer or coupling fingers which enable the ciphers in a number to be printed automatically. One of these transfer fingers is secured to each of the shifting arms 158, as represented in Figures 3, 7 and 14 and extends laterally toward the right therefrom into engagement with the shifting arm of the next lower hammer pawl, as represented in Figure 22. If any one of the printing segments remains in its lowest position, so that its cipher remains at the printing line and the next higher printing segment has been raised for printing a higher number or digit, the transfer finger of the higher hammer-shifting arm 158 while being moved rearwardly by the cam of its companion printing segment, is caused to engage with the shifting arm 158 of the next lower hammer pawl and shift the latter backwardly, so that its hook is carried backwardly over the lower shoulder of the companion hammer. Upon now depressing the trip bar 151, the higher hammer pawl 153 is coupled with its hammer, and the next lower hammer pawl is also coupled with its hammer, whereby an impression of the cipher or zero type on the lower segment is produced on the platen at the same time that the next higher number is printed on the platen. If two ciphers occur in succession in body of a number, the shifting arm to the left of the highest order printing segment to be operated for printing a zero sets the hammer mechanism of said highest zero-printing segment by means of the transfer finger of said shifting arm, and the shifting arm of said highest zero-printing segment in turn by means of its transfer finger sets the hammer mechanism of the printing segment of next lower order, etc. This operation of producing an impression of the cipher type is effected automatically and renders it possible to print any number of ciphers in succession in the body of a number because the hammer operating mechanism of each segment which remains standing with its upper type at the printing line is controlled by the hammer operating mechanism of a higher type segment and in turn controls the hammer operating mechanism of the next lower type segment, if the next lower segment presents a cipher to the printing line. Only the ciphers below the highest digit in the number to be recorded are thus printed automatically because the printing of a digit depends upon the upward movement of a printing segment thereby avoiding the printing of ciphers ahead of the highest digit in the number to be recorded. The hammer shifting device of the segment which prints the numbers representing units of cents is preferably, not provided with a transfer finger to operate on the hammer shifting device of the segment which prints fractions of a cent, because it is proper that the space to the right of the lowest integer shall remain blank when no fraction is recorded therein.

The carrying bar 151 is raised by one or more springs 166 (Fig. 8) which connect this bar with the transverse rod 12, and the upward movement of the bar 151 is arrested when the hammer operating pawls reach their highest position by a transverse bar 167 (Figs. 13, 18 and 22) which is engaged by the rear ends of the rock arms 152. 168 represents a coupling hook, whereby the hammer trip devices are depressed. This hook is pivoted with its upper end to the trip bar 151 and its lower engaging end is provided with a notch having upper and lower shoulders.

In the lowered position of this hook its notch engages with a cross bar 169 which is connected with the rock arms 24, as represented in Figures 2 and 7, so that the hook and the hammer operating devices connecting therewith are actuated from the rocking frames 15 and 29, through the medium of the rock arms 24. In the rearmost position of the rocking frames, the front ends of their notches 28 bear against the front side of the bar 25 to which the gear segments are yieldingly connected, and the cross bar 169 bears against the rear or upper shoulder of the notch of the hook 168, as represented in Figure 2. Upon swinging the rocking frames forward, the incline of the cam 14 first raises the rock arm 13 and shifts the gear segments into engagement with the dial pinions, and after the segments have been so shifted, the rear shoulders of the notches 28 in the rocking frames, engage with the cross bar 25, so that thereafter this bar is carried downwardly with the rocking frames and the gear segments are depressed. During this downward movement of the bar 25 with the rocking frames, the companion bar 169 moves down idly in the notch of the hook 168 until this bar engages with the lower or front shoulder of this hook. After the cross bar 169 engages with the lower shoulder of the notch of the hook, the latter and the hammer operating devices connected therewith are moved downwardly with the rocking frames until these frames reach the end of their downward movement. During the last portion of the downward movement of the rocking frames the hammer pawls are disengaged, as before described, from the retracted hammers, whereby the latter are released and strike the type carriers which are at the printing line. By this means, the blow of the hammers is delivered after the registering of the numbers has been effected on the dials and the type segments have been shifted into their proper position for recording the respective number.

The hammers do not follow the type carriers to the end of their outward movement, but are stopped short, after delivering a blow against the inner ends of the carriers by their depending arms 150 engaging with a rubber facing 170 on the cross bar 167, as shown in Figure 3, so that the types are moved outwardly by the impact of the hammers and are then returned by their springs so as to clear the printing surface.

*Non-print mechanism*

When it is desired to only add the numbers and not record the same, the coupling hook 168 is raised with its notch out of engagement with the cross bar 169, which allows the rocking frames and connecting parts to move back and forth without affecting the hammer operating devices. The coupling hook is disengaged from the cross bar by means of an elbow lever 171 secured to a transverse rock shaft 172. The lower arm of the elbow lever is connected with the shaft 20 by a spring 173, whereby the lever and the shaft carrying the same are turned in the direction for disconnecting the upper arm of the lever 171 from the hook 168, thereby permitting the latter to engage the bar 169. 174 (Fig. 18) represents an elbow lever arranged below the bottom of the keyboard and connected by a line or cord 175 with its lower arm to the upper arm of the elbow lever 171. 176 represents a shifting key having a depending stem which is guided in the top and bottom of the key board and which engages with its lower end against the upper arm of the elbow lever 174. Upon depressing this key the elbow lever 174 is turned in the direction for moving the rock arm 171 into engagement with the coupling hook 168 and disengaging the latter from the cross bar 169, thereby throwing the recording mechanism out of gear. Upon releasing the key 176, the rock arm 171 is permitted to swing backwardly and allow the coupling hook to engage with the cross bar 169 thereby throwing the recording mechanism into gear. When the gear segments and the printing segments are thus operated relatively to the keys which have been depressed, the number represented by the depressed keys is registered and also recorded by the printing mechanism. The addition of further numbers proceeds in like manner the several numbers added successively by the registering mechanism but each number is printed individually by the recording mechanism.

When it is desired to print or record the total at the foot of the column of the numbers which have been printed, the operation is as follows: The total key 84 is first depressed thereby raising the cam 14 into an inoperative position and lowering the cam 67 into an operative position. Upon now moving the rocking frames 15 and 29 forwardly, the feeling levers 61 are turned so as to move their feeling fingers forwardly into engagement with the respective cams 57 and at the same time each feeling lever carries the adjacent key lever forwardly so that its particular stop shoulder 39 corresponding to the position of the trip cam 57 and its dial is moved into the path of the stop lug 34 of the controlling arm. After the key levers have been thus shifted forwardly into their respective positions corresponding with their dials, the continued forward movement of the rocking frames causes the gear segments while in a retracted position out of engagement with the dial pinions to be depressed until each segment is arrested by the engagement of the stop lug on its controlling arm with the respective stop shoulder of its key lever, whereby each printing segment is raised so as to present the type carrier to the printing point which carries the type corresponding to the number registered on its companion dial. During the last part of the forward and downward rocking movement of the rocking frames the hammers are operated and the particular type at the printing line are impressed on the platen. Upon now swinging the rocking frames backward, the gear segments are raised while still in a retracted position out of engagement with their companion dial pinions, thereby permitting further numbers to be added to the total already registered on the dials. If, however, it is desired to turn the dials back to zero, after the total of the added numbers has been printed or recorded, the gear segments, while in the retracted lower position which they occupy while printing the totals, are moved forwardly into engagement with their respective dial pinions by the depression of the key 87. Upon now moving the rocking frames backwardly the gear segments are raised while in their forward position in engagement with their pinions, whereby each of the latter is turned backwardly and when the segments reach the end of their upward movement, the dials have been turned backwardly a number of spaces corresponding to the number on the dial, thereby turning all of the dials to zero.

*Duplicate printing by counterpart types*

For the purpose of permitting the numbers to be printed in duplicate, for instance, when it is desired to print an amount on a bank check, and the same amount on a stub, the machine is provided with mechanism which is constructed as follows:

1410 (Figs. 1, 21, and 22) represents a number of duplicate printing or type segments which are arranged transversely in line and preferably toward the right of the main printing segments 141, and which are pivoted loosely at their front ends on the supporting rod 31. One of these duplicate number printing segments is provided for each of the main number printing segments and each duplicate segment is connected with its companion main segment by a U-shaped frame (Fig. 24) which is connected by the upper ends of its arms 189 to its duplicate and main segment and has its cross bar 190 arranged transversely below the intervening segments, as shown in Figures 1, 2, 4, 7 and 24. The cross bars 190 are arranged sufficient distances below the segments so that each pair of connected main and duplicate printing segments can be raised to its highest position without interfering with the other segments. For the purpose of permitting the connecting frames of the several pairs of printing segments to be arranged compactly, the arms of the connecting frame are curved concentrically with the pivots of the segments, as represented in Figures 2 and 4. Each of these duplicate printing segments if provided with type carriers corresponding to and constructed the same as the type carriers of its companion main segment and each of these duplicate segments is provided with a hammer operating device which is constructed the same as the hammer operating devices of the main segments, and the same description and letters of reference, therefore apply to the details of both the main and duplicate printing segments.

*Horizontal ruling*

For the purpose of producing horizontal or cross ruling upon the sheet or surface which receives the record, the following mechanism is provided:—

193 (Figs. 2, 4 and 23) represents the lowermost type carrier of each of the number printing segments, each of which is provided at its rear end with a horizontal ruling type. Each of these ruling type carriers is constructed the same as the number type carriers with the exception that the front end of each ruling type carrier is widened horizontally, preferably, in both directions in the form of the letter T, as shown in Figure 23, and the ruling type extends transversely from end to end of the widened part of this carrier, so that the ruling types, when placed transversely in line and driven against the platen will produce a practically continuous line transversely on the recording surface. Each of the number key levers is provided on the front side of its upper arm with a ruling stop or shoulder 194, which is arranged one space below the lowermost number registering stop or shoulder 39.

Upon swinging the key levers, so as to bring their ruling shoulders 194 into the path of the lugs 34 of the controlling arms, the latter together with the gear segments connected therewith are depressed upon moving the rocking frames 15 and 29 forwardly until the stop lugs 34 of the controlling arms engage with the lowermost or ruling shoulders 194 of the key levers. When the controlling arms reach this lowermost position, the printing segments connected therewith have been raised to their highest position and present the ruling types of all of the segments to the printing line. During the last portion of the forward movement of the rocking frames 15 and 29, while the ruling types are at the printing line, the proper hammers are operated for producing an impression of these types. The key levers are turned simultaneously for printing all of their ruling shoulders simultaneously into the path of the stop lugs of the respective controlling arms by means of a rocking plate 195 which is arranged transversely in front of the lower arms of the key levers and overhangs the front ends thereof, as represented in Figures 2 and 7. This rocking plate is secured to a transverse rock shaft 196 which is journaled in the frame of the machine and which is turned for holding the rocking plate in its uppermost position out of engagement from the key levers by means of a spring 197 (Fig. 29).

198 (Fig. 18) represents a shifting key whereby the parts are shifted to permit of producing cross or horizontal ruling. This key is provided with a depending stem which is guided in the top and bottom of the keyboard and which engages against the rear end of a rock arm 199 projecting rearwardly from the rock shaft 196, as represented in Figure 18. Upon depressing this key, the rocking plate 195 is turned in the direction for depressing the front arms of all the number key levers and bringing the ruling shoulders 194 on the upper arms thereof into position for arresting the type segments during their upward movement when the ruling types arrive at the printing point. In order to prevent the gear segments from meshing with the dial pinions during the cross ruling operation the position of the cams 14 and 67 is reversed at the same time that the plate 195 is depressed. This is effected by a depending arm 1960 secured to the shaft 196 and connected by a cord or wire 1961 with the branch wires 82, 83 leading to the shifting levers 76 and 78 as represented in Figure 18. When it is desired to produce horizontal ruling on the recording surface, the key 198 is depressed thereby raising the cam 14 into an inoperative position, depressing the cam 67 into an operative position and moving all the number key levers with their ruling shoulders 194 into the paths of the stop lugs of the controlling arms. Upon now moving the handle 21 (Fig. 21) forwardly, the rocking of the frames 15 and 29 first causes the gear segments together with their controlling arms to be moved downwardly until arrested by the ruling shoulders of the keys, in which position of the parts, the printing segments have been raised with their ruling types to the printing line. The continued forward movement of the rocking frames operates the hammer tripping mechanism and produces an impression of the ruling types on the recording surface. Upon now moving the handle 21 backwardly and releasing the key 198, the parts resume their normal position. While the cams 14 and 67 are reversed, so as to move the gear segments downwardly out of engagement with the dial pinions for producing horizontal ruling, the feeling levers are also shifted, but this movement of the feeling levers is of no effect.

*Vertical ruling*

Mechanism is provided whereby vertical ruling may be produced on the recording surface, this mechanism being constructed as follows:—

203 (Figs 1, 17, 21 and 22) represents an upright ruling lever which turns loosely on the supporting bar 12 and which is arranged between the dollars and dimes printing segments. The upper arm of the ruling lever is provided with a vertical ruling blade 204 (Fig. 17) which is arranged close to the platen when in its upper position. The ruling lever is yieldingly held in this position by means of a spring 205 connected with the lower arm of the ruling lever and the movement of the latter toward the platen is limited by the engagement of its lower arm with the rear side of a rubber buffer 206 on the cross bar 167 similar to the rubber 170. 207 represents a pawl whereby the ruling lever is retracted and then released for permitting the same to deliver a blow against the recording surface, for producing a vertical ruling impression thereon. This pawl is pivoted at its lower end on the cross bar 151 and is yieldingly held with the hook 208 on its upper arm in engagement with a shoulder 209 on the ruling lever by means of a spring 210 which connects the lower arm of the ruling lever with the rod 162.

In the uppermost position of the bar 167 the ruling pawl engages the shoulder of the ruling lever and upon depressing this bar, the ruling lever is pulled downwardly by the ruling pawl. During this downward movement of the ruling lever and pawl, the front side of this lever engages with the upper arm of the pawl and gradually crowds the pawl forward until the pawl is disengaged from the shoulder of the lever. When the ruling lever is thus released from the pawl, the lever is quickly turned by the spring 205 in a direction for throwing its upper arm upwardly, whereby its blade delivers a blow against the recording sheet or surface on the platen and produces a ruling impression thereon. During the last portion of the subsequent upward movement of the ruling pawl portion of the subsequent upward movement of the ruling pawl 207 its hook again engages over the shoulder of the ruling lever. This construction of vertical ruling devices produces the vertical ruling in sections by successive blows of the ruling blade.

Word printing mechanism

For the purpose of permitting words to be printed in front of the numbers which are added together the following mechanism is provided:—

1411 (Figs. 8, 21 and 22) represents a word-printing segment which is mounted loosely on the rod 31 next to the highest number printing segment of the main number recording mechanism. This segment is provided with a number of radially movable carriers 1420, (Figs. 8 and 22) which are constructed the same as the carriers of the number printing segments and each of which is provided on its face with a word-type. The words of these types are selected according to the purpose or business for which the machine is to be used. For instance, if the machine is to be used in a bank, types representing the words "Vouchers," "Checks," "Drafts," "Bills," and similar words common to the banking business may be used. When the machine is designed for use in a restaurant the words "Soup," "Vegetables," "Meats," "Deserts," and other words peculiar to this business may be used.

The position of the word type segment is controlled by a key lever 3600, Fig. 8, which turns on the bar 35 is similar to the number key levers and is provided on the front side of its upper arm 3700 with a vertical series of differential stops or shoulders 3900 which are adapted to be engaged by the stop lug 3400 of a controlling arm 3000; and lever 3600 is also provided with a locking stop or shoulder which is adapted to be engaged by a locking lug 3300 on the controlling arm, as represented in Figure 8. The controlling arm 3000 is connected with the word-printing segment by a connecting bar 1460. The stop shoulders on the upper arm of the word key lever are so arranged that upon swinging this lever so as to carry different shoulders into the path of the stop lug on the controlling arm, the latter will be arrested at different points in its downward or forward movement and the word printing segment connected therewith will be stopped at different points in its upward movement and present the particular word type to the printing point which corresponds with the shoulder or stop on the word key lever. The upward movement of the controlling arm 3000 is limited by its rear locking lug 3300 engaging with the stop bar 32 which arrests the upward movement of the controlling arms 30 of the number registering and recording mechanism. The downward movement of the controlling arm 3000 and the simultaneous upward movement of the word printing segment is effected by a spring 215 which yieldingly connects this arm with the bar 25 to which the registering gear segments are connected.

216 Fig. 1, represents a row of word keys having depending stems which are guided in the top and bottom of the key-board and which engage against the upper side of the front arm 3600 of the word key lever at different distances from the fulcrum thereof. Upon depressing any of the word keys the word key lever will be turned the proper distance to bring its proper stop shoulder into the path of the stop lug of the companion controlling arm and arrest the word type segment during its upward movement, when the word type corresponding with the word of the depressed key has reached the printing line. When the respective word type is in this position the same is driven against the recording surface for producing an impression thereon, at the same time that the printing of the numbers by the numbering printing segments is effected. The word types are driven against the platen by a hammer operating mechanism which is constructed the same as the hammer operating devices of the number printing mechanism and the same letters of reference are therefore used to denote the same. The word key lever is yieldingly held in its normal position by a spring 600.

Auxiliary adding mechanism

An auxiliary adding mchanism is provided which permits of effecting an addition of numbers different from the numbers which are added by the main adding mechanism.

This auxiliary adding mechanism is constructed as follows:

2000 (Fig. 13) represents a number of auxiliary dials which are mounted on the left hand end of the dial shaft 3. 5000 represents a number of auxiliary gear segments which are mounted on the transverse rod 7 and are adapted to engage with gear pinions, 400 on the auxiliary dials. Each gear segment 5000 is connected with a controlling arm 3001 arranged adjacent to the gear segment by a latch or coupling which at times permits the segment to move independently of the controlling arm. 3601 and 3701 represent auxiliary key levers which are operated by auxiliary keys 401 (Fig. 1) and which control the operation of the auxiliary registering and recording mechanism. The detail construction of the dials, gear segments, printing segments, key levers and the parts co-operating therewith, of the auxiliary registering and recording mechanism, is substantially the same as the construction of the same parts in the main registering and recording mechanism, except as hereinafter distinguished, and the same letters of reference are therefore employed to denote like parts in both of these sets of mechanisms.

In the drawings, two auxiliary key levers and three auxiliary dials are shown, which permit of registering and recording a total of 999, but additional registering and recording devices may be employed if it is desired to increase the capacity of the machine.

In the auxiliary mechanism each of the higher gear segments 5000 (Fig. 1) is provided with a pivot latch 501 the same as in the main registering mechanism. The lowest or primary gear segment of the auxiliary registering mechanism is provided with a movable latch 502 (Fig. 13) which is adapted to be engaged with or to be disengaged from the upper guide face on its companion controlling arm, but for the purpose of the present application this latch might be dispensed with and the primary gear segment constructed the same as the primary gear segment of the main registering and recording device.

In the auxiliary registering mechanism the gear segments are not provided with lower stops 46 like those of the gear segments of the main registering mechanism, which permits the auxiliary controlling arms to move downwardly when necessary independently of the auxiliary gear segments. The upward movement of the auxiliary gear segments is limited by stops 218 with which the upper ends of the gear segments engage. 219 represents a foot formed on the lower side of each controlling arm 3001 and adapted to engage with the lifting cross bar 22. However, for the purposes of the present application the auxiliary mechanism could be made exactly as the main number registering and recording mechanism is made.

For the purpose of effecting an ordinary addition of numbers on the auxiliary registering mechanism, the auxiliary key levers are shifted into the proper position by the depression of the keys 401 representing the numbers to be added and then the rocking segments 15 and 29 are turned forwardly. During the forward movement of the rocking frames the auxiliary gear segments are first moved into engagement with the auxiliary dial pinions by the cam 14 and then pulled down by the springs 27, and the controlling arms are also pulled down by the latches of the gear segments engaging with the controlling arms. The downward movement of the gear segments and controlling arms continues until the stops 34 of the controlling arms strike the shoulders 39 on the key levers which stand in the path of the stops 34. At the end of the forward movement of the rocking frames the gear segments are withdrawn from the dial pinions by the springs 60; and during the subsequent backward movement of the rocking frames, the gear segments and controlling arms are raised by the cross bar 22 engaging with the gear segments and with the feet 219 of the arms. The carrying of numbers from the units dial to the tens dial and from the latter to the hundreds dial and the turning of the dials to zero is effected in the same manner as in the main registering mechanism.

By this organization of the machine, numbers such as sales or pieces of goods can be added and recorded by the main registering mechanism, and other numbers such as the rebate on sales or discount on the prices of the goods, can be separately added and recorded by the auxiliary registering mechanism.

The key controlled devices whereby the parts of the main registering and recording mechanism are shifted into the proper position preparatory to registering and recording a number are distinct from the key controlled devices whereby the same effect is produced in the auxiliary registering and recording mechanism but both sets of registering and recording mechanisms are operated simultaneously by the one universal shifting mechanism for effecting the registration and recording of the numbers which are represented by the different positions of both key controlled devices.

*Date printing*

For the purpose of permitting the date to be printed on the impression surface the following mechanism is provided:—

247 (Fig. 16) represents a year printing lever which is arranged toward the left of the auxiliary registering and numbering mechanism and which is mounted loosely upon the rod 12 which supports the hammers of the printing segments. The upper arm of the year lever is provided with a year type 248 representing the year to be printed, and this lever is turned for moving its type against the platen or the impression surface by means of a spring 205 secured to the lower arm thereof. The year printing lever is turned so that its type moves away from the platen and is then permitted to spring back quickly so as to produce an impression of its type on the impression surface, by means of an operating mechanism which is constructed the same as the operating mechanism which is constructed for blade 204, shown in Figure 17, and the same reference letters are therefore used to denote like parts in these operating mechanisms.

249 (Figs. 1, 15, 21 and 22) represents three printing segments whereby the months and the days of the months may be printed and which are arranged in the order named, on the left hand side of the year printing lever.

Each of these segments is pivoted at its rear end on the same bar 31 which carries the other printing segments and is provided with type carriers which are constructed the same as the type carriers of the other printing segments. The units dating segment, whereby the days of the month from zero to 9 are printed is provided with ten correspondingly numbered type carriers. The tens dating segment, which prints the days of the month above 9 in connection with the units dating segment, is provided with three type carriers bearing the numbers 1, 2 and 3. The month printing segment is provided with twelve type carriers which are provided with type characters representing the different months of the year.

Upon shifting the several type or printing segments of the dating mechanism, so as to carry the desired month and day of the month to the printing line the respective type may be driven against the impression surface for recording the date represented by the same. Each of the month and day printing segments is retained in its adjusted position by means of a catch 250 projecting upwardly from the segment and engaging with the notches of a curved bar 251 secured to the adjacent stationary part of the machine as represented in Figures 1 and 15. The notches in each of these bars are spaced to correspond with the position of the type when the same are at the printing point, and each of these notches is marked according to the month or day of the month which it represents, as shown in Figure 1, for the purpose of enabling the operator to readily set the dating mechanism.

Each of the dating segments is provided with a printing hammer which is constructed the same as the printing hammer of the other printing segments as shown in Figure 15. The printing hammer of each date printing segment is depressed by a pawl 252, shown in Figure 15, which, when free, is moved rearward by a spring 253 so that its shoulder or hook engages with the lower shoulder 156 of the adjacent printing hammer and pulls the latter downwardly when the bar 151 is depressed. When the bar 151 is near the end of its downward movement, the pawl 252 is crowded with its hook from said lower shoulder by the upper shoulder 157 of the hammer engaging with the upper end of the pawl, thereby liberating the hammer and permitting the same to deliver a blow against the date type carrier which is at the printing line, for producing an impression thereof.

Inasmuch as the printing of the date is not required frequently, the pawls of the month, day and year printing mechanism are held in an inoperative position when it is not desired to print the date, by means of a rock lever 254, as shown in Figures 15, 16, 18 and 22. This rock lever is provided on its upper arm with a cross bar 255 which is arranged transversely in rear of the several pawls of the dating mechanism. The rock lever 254 is turned by a spring 256, so as to move its upper arm forwardly and cause its cross bar to engage with the rear side of the pawls 207 and 252 of the dating mechanism and shift them into an inoperative position out of engagement with the lever 247 and hammers 147 respectively. While the dating pawls are in this position, the same move up and down idly without operating the date printing mechanism, but the pawls of the other printing segments are free to operate.

257 (Figs. 1 and 18) represents a shifting key whereby the pawls of the dating mechanism are released and permitted to move into their operative position for printing the date. This key is provided with a depending stem which is guided in the top and bottom of the key-board and which engages with its lower end against the upper arm of an elbow lever 258, as represented in Figure 18. The lower arm of this elbow lever is connected by a line or cord 259 with the lower arm of the lever 254. Upon depressing the shifting key 257 its respective elbow lever shifts the rock lever 254, so that the cross bar on its upper arm moves rearwardly from the dating pawls and permits the latter to assume an operative position.

*Platen mechanism*

The frame of the carriage which supports ported and operated and the sheet or other impression surface which receives the record is presented to the printing line, is constructed as follows:—

The frame of the carriage which supports the platen, paper and inking device consists of a transverse supporting sleeve 260 (Figs. 1, 2, 18, 20, 21 and 22) arranged in rear of the printing mechanism and provided at opposite ends with two upwardly and forwardly projecting arms 261 and with two upwardly and rearwardly projecting arms 262. The supporting sleeve is arranged to slide transversely on a rod or track 263 which is secured with its ends to the sides of the frame.

The platen is journaled in the upper ends of the front arms 261 of the paper carriage and is held in position at the printing line by means of a catch 264 (Figs. 1 and 22) which engages with its front hooked end over a transverse rod 265 arranged below the platen and secured with its ends to the sides of the main frame. This catch is yieldingly connected with the paper carriage, so as to permit the platen to recede more or less from the printing mechanism for the purpose of adjusting the platen to the thickness of the sheet of paper or other object which receives the impression and which is interposed between the platen and the printing types. This yielding connection forms no part of the invention claimed in the present application and will therefore not be described in full. This matter is fully described and claimed in my pending divisional application Serial No. 242,395, filed June 28, 1918, to which reference is hereby made. For the purposes of the present application any suitable means may be employed for the purpose of holding the platen in printing relation with the printing types. When printing upon a sheet of paper, this sheet is fed forwardly underneath the platen and upwardly in front of the same, so that the sheet passes the printing line. The sheet is pressed against the underside of the platen, in rear of the printing line, by a transverse presser roller 270 (Figs. 2 and 18) arranged below the platen and journaled with its ends in the front arms 261 of the paper carriage.

Platen feed or line-spacing 283 (Figs. 18, 21 and 22) represents a platen feed lever which is pivoted loosely on the left end of the platen shaft and which is provided on its rearwardly projecting arm with a pawl 284 which engages with a ratchet wheel 285 secured to the adjacent end of the platen, as represented in Figures 1 and 18. 286 represents an intermediate actuating lever which is pivoted on the lower part of the front carriage arm 261 which is adjacent to the ratchet wheel 285. The ratchet lever is connected with the intermediate lever by means of a link 287 which is pivoted at its upper end to the rear arm of the ratchet lever and is provided at its lower end with a loop 288 which receives the rear arm of the intermediate lever. 289 represents a spring connects the front arms of the ratchet lever and intermediate lever. The upper end of this spring is connected with the front arm of the ratchet lever a greater distance from the pivot of the latter than the distance between the connection of this spring with the intermediate lever and the pivot of the latter. By this connection of the spring 289, the leverage of the ratchet lever is greater than that of the intermediate lever which causes this spring, when both of these levers are free, to turn these levers simultaneously in the direction for raising their rear arms, thereby moving the ratchet pawl upwardly or backwardly for taking up a new tooth on the ratchet wheel.

The ratchet pawl is yieldingly held in engagement with the ratchet teeth by means of a spring 290. The movement of the intermediate lever in the direction for raising its rear arm and moving the ratchet pawl backwardly is limited by means of a nose 291 formed on this lever and engaging with a stop on the adjacent arm of the carriage, as represented in Figure 18.

The rocking motion of the intermediate lever is always the same, and in order to enable the same to turn the platen different distances, the rear arm of the intermediate lever is provided on its under side with a number of notches 292 which are arranged different distances from its fulcrum, and one or another of which is engaged by the lower end of the loop 288 on the connecting link 287. Upon engaging this loop with the notch of the intermediate lever nearest its axis the ratchet pawl is shifted so that the platen is turned one line-space at a time; while upon shifting this loop into engagement with one of the outer notches of the intermediate lever, the platen will be turned forward by its ratchet mechanism a correspondingly greater distance by the operation of the machine. The intermediate lever is turned in the direction for shifting the platen, by a transverse bar 293 arranged below the front arm thereof, as represented in Figures 1, 2, 7, 18 and 22. This bar is supported upon the upper ends of two rock arms 294 which are mounted loosely with their lower ends on the cross bar 167. 295 (Fig. 18) represents a depending arm which is preferably formed in one piece with that one of the arms 294 arranged on the left hand side of the machine. This depending arm is provided with a nose which is arranged in rear of and in the path of the rocking frame 29.

During the last portion of the rearward movement of this rocking frame, it engages with the nose of the depending arm 295 and moves the same rearward and the upper arms 294 connected therewith are moved forwardly, thereby causing the cross bar 293 to be carried upwardly and turn the intermediate lever in the direction for feeding the platen and paper forwardly. During the forward movement of the rocking frame 29, the rock arms 294 are turned backwardly, together with the intermediate lever and connecting parts, by the spring 289 preparatory to feeding the platen forward the next space. As the line-spacing of the record sheet by feeding the platen occurs after each item is printed and in the same operation in which said item is printed, the printed record is fed up into visible position at each operation of the machine.

If desired the platen may be turned by hand when it is desired to adjust the paper, this being effected by releasing the pawl 284 from the ratchet wheel and then turning the platen by means of a button 296 secured to one end of the shaft, as shown in Figures 1, 21 and 22.

The cross bar 293 extends a sufficient distance transversely of the machine so as to engage with the front arm of the intermediate rock lever 286 in all the positions which the paper carriage can be shifted transversely in the machine.

Non-print renders paper feed inoperative

In order to render the paper feeding mechanism inoperative during the time that the printing mechanism is out of gear, the operating mechanism of the printing paper feeding mechanism is so connected that the printing and paper feeding mechanisms are thrown into and out of gear simultaneously.

A simple means for this purpose consists of a link 297 (Figs. 18 and 22) connected at its front end with a depending arm 298 on the rock shaft 172 and provided at its rear end with a slot 299 which receives a pin 300 on the depending arm 295. Upon turning the rock shaft 172 by means of the key 176 in the direction for engaging its upper arm 171 with the hook 168 (Fig. 2) and disengaging the latter from the bar 169, the link 297 is moved rearwardly so that the front end of its slot engages with the pin of the depending arm 295 and holds the latter in its rearmost position. While the depending rock arm is so held it cannot move forwardly with the rocking frame 29 and consequently the ratchet pawl of the paper feed mechanism does not move backwardly for taking up a new tooth on the ratchet wheel.

Upon releasing the key 176 the rock shaft 172 turns in the direction for coupling the printing mechanism with the rocking segments, the link 297 is moved forwardly, and the front end of its slot is carried forwardly a sufficient distance to permit the rock arm 295 to oscillate freely for actuating the paper-feeding mechanism.

*Horizontally movable carriage*

The paper carriage is capable of sliding lengthwise on the rods 263 and 265 for presenting different parts of the paper to any particular type and is held in its adjusted position by a spacing device which consists of a graduated adjusting sleeve 301 and an adjusting catch 302, as represented in Figures 2 and 20. For the purposes of the present application, it is sufficient to say that the carriage is held against horizontal movement by the catch 302 engaging any of the notches in the sleeve 301. This mechanism is described in detail and claimed in another divisional application Serial No. 242,395, filed June 28, 1918, to which reference is hereby made.

*Manual lock for non-printing key*

For the purpose of locking the non-printing key 176 in a depressed position when it is desired to continue the use of this key and the mechanism controlled thereby indefinitely, the key is provided with a movable locking block 362 (Fig. 18). This block is arranged below the top of the keyboard, adjacent to key 176, and is provided with a thumb piece 363 (Fig. 27) which is guided in a slot 364, in the top of the keyboard and projects above the same. Upon retracting the locking block from above the stop shoulder of the shifting key, the key can rise to its uppermost position. Upon depressing this key and then shifting the locking block so that it is arranged between the stop shoulder 44 of the key and the top of the keyboard, the key is held in a depressed position.

Any suitable inking means may be employed, and the mechanism shown for this purpose is not fully described in this application, as this specific structure is not an essential part of the invention claimed herein. This specific inking mechanism is fully described in the parent application Serial No. 1,004, now Patent No. 1,429,201 and is fully described and claimed in another divisional application Serial No. 264,065 filed September 14, 1918 and eventuating in Patent No. 1,590,024, granted June 22, 1926, to which reference is hereby made.

Any suitable full stroke mechanism may be provided to prevent the operator from making only a partial forward and backward stroke of the rocking frames 15 and 29, and the mechanism shown for this purpose is not fully described in this application. This specific structure is not an essential part of the invention claimed herein, and is fully described and claimed in various combinations in the parent application Serial No. 1,004, now Patent No. 1,429,201, and in the divisional applications Serial Nos. 183,397 and 183,398, to which reference is hereby made.

Any suitable mechanism may be provided to hold the keys when they are moved from normal to operative position, and to release the number keys upon operating the operating mechanism and upon operating the total key, and the mechanism for this purpose is not fully described in this application. This specific structure is not an essential part of the invention claimed herein and is fully described and claimed in the parent application Serial No. 1,004 now Patent No. 1,429,201, and in other divisions thereof, to which reference is hereby made.

I claim:

1. The combination of calculating mechanism, a platen, a set of numeral types co-operative with said calculating mechanism and said platen so as to print numbers according to the calculations of said calculating mechanism, a second set of numeral types comprising duplicates of types of the first said set and adapted to be impressed concurrently with the corresponding types of the first said set, and means whereby both of said sets of types can be rendered incapable of being impressed while the calculating mechanism remains capable of performing its calculations.

2. The combination with a registering device, a platen and a segment provided with type-carriers, of a hammer adapted to engage said carriers, an actuating pawl adapted to engage said hammer, a movable support carrying said pawl, and a coupling whereby the movable pawl support may be connected with or disconnected from the actuating mechanism of the registering device, substantially as set forth.

3. The combination of accumulating mechanism, a platen, numeral types co-operative with said platen for printing items accumulated by said accumulating mechanism, a keyboard comprising keys and upon which items to be accumulated and printed are set up, a hand-controlled operation-controlling member for effecting accumulating by said accumulating mechanism and movement of said types toward said platen for printing according to the control of said keys, and means for preventing printing movement of said types toward said platen, while permitting the actuation of said accumulating mechanism under the control of said keys.

4. In a calculating machine, the combination of a plurality of accumulators, actuating means therefor, printing mechanism for printing items accumulated on said accumulators, operating mechanism for operating said actuating means and said printing mechanism, means whereby the operation of said operating mechanism may be caused to clear said accumulators of the accumulations standing thereon, means whereby said printing mechanism may be rendered in effective during clearing operations of said machine, and a stationary keyboard from which the accumulating of said accumulators, the clearing thereof, and the rendering of said printing mechanism ineffective, may be controlled.

5. In a machine comprising calculating mechanism, a platen, a set of numeral types co-operative with said calculating mechanism and platen so as to print numbers on a record sheet according to the calculations of said calculating mechanism, in combination, means co-operative with said numeral types and automatically operable to print a cross-rule on said record sheet and means whereby said numeral types and the cross-rules-printing means can be simultaneously rendered incapable of printing while said calculating mechanism remains capable of calculating.

6. In a calculating machine, the combination of a set of accumulators, number printing mechanism for printing on a record sheet items accumulated on said set of accumulators, a plurality of types operable for printing matter other than numerals on said record sheet and in juxtaposition to the items printed by said number printing mechanism, means common to and for operating said number printing mechanism and said types, manipulative devices for controlling what shall be printed by said types, and means for simultaneously rendering said types and said number printing mechanism operative and inoperative with relation to the operating means whereby items accumulated on the accumulators may be printed or not as desired.

7. In a calculating machine, the combination of a plurality of sets of accumulators, each of said sets being operable to accumulate a series of items which may be different from those accumulated by another of said sets of accumulators; printing mechanism for printing items accumulated by said sets of accumulators; operating mechanism common to and for operating a plurality of said sets of accumulators simultaneously and for effecting printing by said printing mechanism; and a device for rendering printing, which printing is under control of said operating mechanism, effective and ineffective.

8. In a calculating machine, the combination of a plurality of sets of accumulators, each of said sets being operable to accumulate a series of items which may be different from those accumulated by another of said sets of accumulators; a plurality of sets of number printing types, one set of number printing types for each of a plurality of said sets of accumulators for printing items accumulated thereon; operating mechanism common to and for operating a plurality of said sets of accumulators and a plurality of said sets of number printing types; and means for rendering printing by all of said sets of numeral types, which printing is under control of said operating mechanism, ineffective.

9. The combination of a platen, types co-operative with said platen for printing, a keyboard comprising keys and upon which the matter to be printed is set up, an operation-controlling member for effecting movement of said types toward said platen according to the control of said keys, and manipulative means for preventing movement of said types toward said platen.

10. The combination of a platen, types co-operative with said platen for printing, a keyboard comprising keys and upon which the matter to be printed is set up, an operation-controlling member for effecting movement of said types against said platen according to the control of said keys, shifting means for preventing movement of said types against said platen, means for locking said shifting means when the latter is shifted to position to prevent movement of said types against said platen, and means for releasing said shifting means from said locking means upon the operation of said operation controlling member.

11. In a printing mechanism, the combination of a movable type, a hammer for driving said type to print, a spring for actuating said hammer, an engaging element on said hammer, a shouldered member adapted to engage with said engaging element to resist the action of said spring, means for releasing said shouldered member from said engaging element for effecting type-driving movement of said hammer, and means correlated with the above enumerated mechanism for rendering said hammer inoperative.

12. In a machine of the class described, provided with printing mechanism comprising type hammers, the combination of mechanism for effecting actuation of said hammers for causing printing, and a non-printing key for preventing the hammers from being actuated.

13. The combination of a platen, types cooperative with said platen for printing, a keyboard comprising keys and upon which the matter to be printed is set up, an operation-controlling member for effecting movement of said types against said platen according to the control of said keys, shifting means for preventing movement of said types against said platen, and means for locking said shifting means when the latter is shifted to position to prevent movement of said types against said platen, said means being operable at a single operation for retaining said shifting means in such shifted position during a succession of operations of said operation-controlling member.

14. In a machine of the class described comprising a printing mechanism provided with type-bars and movable type, means for positioning the type bars, means by which each type is individually propelled to record its respective number, separate holding means for the propelling means, and separate releasing means to permit each propelling means to operate, the combination therewith of means adapted to prevent the propelling means from actuating the type, and a manually depressible key for actuating said preventing means.

15. In a printing mechanism, the combination of a platen, a plurality of carriers carrying types movable toward and from said platen, a plurality of hammers one for each of said carriers, and each operable to actuate type carried thereby, operating means for said hammers, and means whereby said operating means may be rendered effective and ineffective relatively to said hammers.

16. A machine comprising a rotary platen adapted to carry a record sheet and operable for line-spacing the same, types co-operative with said platen for printing items on said record sheet, an operating member operable for causing said platen to line-space said record sheet and for effecting impression of a plurality of said types at a single operation of said operating member, and means for rendering said types operable and inoperable relative to said operating member irrespective of any movement of said platen.

17. In a machine of the character described, the combination of a plurality of sets of number types; a plurality of hammers, one for each of said sets of types, and each hammer operable to effect impressing of its correlated types on a record sheet; letter-printing types whereby a word may be printed on said record sheet; and means for rendering said type hammers ineffective.

18. In a machine of the class described, the combination of a platen for backing a record sheet, devices for actuating said platen to effect line-spacing movement of the record sheet, a plurality of types, operating means for effecting such co-operation of the platen and types as to effect printing on said record sheet, and means for rendering said operating means incapable of effecting printing and automatically rendering said line-spacing mechanism ineffective.

19. In a machine of the class described, the combination of a platen rotatable for line-spacing a record sheet, types for printing on said record sheet, an operating mechanism for said machine, devices operable by said operating mechanism for effecting impressing of said types on said record sheet, mechanism operable by said operating mechanism for effecting line-spacing movement of said platen, and means operable for rendering said devices inoperable relative to said operating mechanism and for rendering the line-spacing mechanism ineffective.

20. In a calculating machine, type-carrying parts, a platen, hammers for driving the type against the platen, a shaft controlling the type-carrying parts and hammers, and means for operating the type-carrying parts without operating the hammers; substantially as described.

21. In a calculating machine, the combination with movable type-carriers, and hammers, of means for preventing movement of the hammers during successive operations of the type-carriers; substantially as described.

22. In a calculating machine, racks carrying type and devices for operating them, hammers for striking the type, pawls holding the hammers, mechanism for releasing the pawls when the racks operate, and means for rendering the releasing mechanism inoperative; substantially as described.

23. In a calculating machine, the combination with type and their supporting devices having reciprocating movement, of spring-actuated hammers for striking the type, and means for preventing movement of the hammers during reciprocating movements of the type-supporting mechanism; substantially as described.

24. In a machine of the class described, comprising adding mechanism and printing mechanism, the latter, comprising separate type, separate means whereby they are individually propelled to record their respective figures, separate holding means for the propelling means, and separate releasing means to permit each propelling means to operate, the combination therewith of means adapted to suspend temporarily the function of the releasing means.

25. In a calculating machine, the combination of a plurality of type carriers; devices, one for each carrier, for effecting printing therefrom; a universal member for causing actuation of said devices; means for operating said universal member; and means for rendering the first said means ineffective.

26. In a calculating machine, the combination of a plurality of type carriers, devices, one for each carrier, for effecting printing therefrom; a universal member for causing actuation of said devices; an operating member; a device connected to said universal member; means for normally engaging said device with said operating member; and means for disengaging said device from said operating member.

27. In a calculating machine, the combination of a plurality of type carriers; devices, one for each carrier, for effecting printing therefrom; a universal member for causing actuation of said devices; an operating-shaft; a device operated by said operating shaft; connecting means operatively related to said universal member and adapted to be engaged with said device, means for normally holding said connecting means in engagement with said device; and means for disengaging said connecting means from said device.

28. In a calculating machine, a set of amount keys, a plurality of denominational series of type controlled thereby, hammers selectively operable in accordance with the proper denominational orders for causing said type to print amounts set up by said keys, and means common to said hammers for rendering said hammers ineffective.

29. In a calculating machine, a set of amount keys, a series of denominational totalizer elements, means controlled by said keys for entering into said totalizer elements amounts set up by said keys, a plurality of denominational series of type controlled by said keys, a plurality of hammers, one for each of said denominational series of type, means whereby the hammers corresponding to the appropriate denominational orders may be operated for printing amounts as an accompaniment to the entry thereof into said totalizer elements, and means common to said hammers for disabling said hammers, whereby amounts may be entered into said totalizer elements without being printed.

30. In a calculating machine, a set of amount keys, a plurality of denominational series of type controlled thereby, a plurality of hammers, one for each denominational series of type, means for withdrawing said hammers preparatory to causing the latter to effect printing impressions from said type, and a common means for rendering said withdrawing means ineffective.

31. In a calculating machine, a set of amount keys, a plurality of denominational series of type controlled thereby, a plurality of hammers selectively operable in accordance with the proper denominational orders for causing said type to print amounts set up by said keys, means for withdrawing and then releasing said hammers, and a common means for rendering the first mentioned means ineffective.

WILLIAM S. GUBELMANN.